United States Patent
Humfeld

(10) Patent No.: US 9,724,845 B2
(45) Date of Patent: Aug. 8, 2017

(54) SYSTEMS AND METHODS FOR MAKING INDEXED PREPREG COMPOSITE SHEETS AND LAMINATED COMPOSITE ARTICLES

(71) Applicant: The Boeing Company, Huntington Beach, CA (US)

(72) Inventor: Keith Daniel Humfeld, Federal Way, WA (US)

(73) Assignee: The Boeing Company, Chicago, IL (US)

(*) Notice: Subject to any disclaimer, the term of this patent is extended or adjusted under 35 U.S.C. 154(b) by 575 days.

(21) Appl. No.: 14/540,844

(22) Filed: Nov. 13, 2014

(65) Prior Publication Data

US 2016/0263776 A1  Sep. 15, 2016

(51) Int. Cl.
| | |
|---|---|
| B29C 65/52 | (2006.01) |
| B32B 37/12 | (2006.01) |
| B32B 37/26 | (2006.01) |
| B32B 38/04 | (2006.01) |
| B32B 38/10 | (2006.01) |
| B32B 38/18 | (2006.01) |

(Continued)

(52) U.S. Cl.
CPC .............. B29B 11/12 (2013.01); B29B 13/08 (2013.01); B29B 15/12 (2013.01); B29C 70/545 (2013.01); *B29C 2793/0009* (2013.01); *B29C 2793/0081* (2013.01); *B29K 2105/0872* (2013.01); *B29K 2307/04* (2013.01); *B29K 2309/08* (2013.01)

(58) Field of Classification Search
USPC ....... 156/228, 230, 231, 237, 238, 246, 247, 156/249, 250, 263, 267, 269, 272.2, 156/272.8, 273.3, 289, 307.1, 307.3, 156/307.4, 307.5, 307.7
See application file for complete search history.

(56) References Cited

U.S. PATENT DOCUMENTS

| | | | | |
|---|---|---|---|---|
| 3,683,736 A | * | 8/1972 | Loose | B29C 65/086 264/154 |
| 4,132,519 A | * | 1/1979 | Reed | B26D 7/086 264/156 |

(Continued)

FOREIGN PATENT DOCUMENTS

| | | |
|---|---|---|
| DE | 4130269 A1 | 3/1992 |
| DE | 19952443 A1 | 5/2001 |

(Continued)

OTHER PUBLICATIONS

English Abstract of JP 2007-131654 (Mar. 9, 2017).*
Extended European Search Report, dated Jul. 25, 2016, for EP patent application No. EP 16155052.0 (6 pgs.).

*Primary Examiner* — Sing P Chan
(74) *Attorney, Agent, or Firm* — Armstrong Teasdale LLP

(57) ABSTRACT

A method of making an indexed prepreg composite sheet is disclosed. The method comprises forming discrete regions in a resin film layer. The discrete regions are arranged in an indexing pattern. The method also includes forming a precursor prepreg composite sheet by impregnating a fiber reinforcement with the resin film layer having a viscosity. The discrete regions of the resin film layer form non-impregnated regions of the precursor prepreg composite sheet. The method additionally includes replacing the non-impregnated regions of the precursor prepreg composite sheet with indexing openings.

20 Claims, 17 Drawing Sheets

(51) Int. Cl.
  *B32B 43/00*   (2006.01)
  *B29B 11/12*   (2006.01)
  *B29B 13/08*   (2006.01)
  *B29B 15/12*   (2006.01)
  *B29C 70/54*   (2006.01)
  *B29K 105/08*  (2006.01)
  *B29K 307/04*  (2006.01)
  *B29K 309/08*  (2006.01)

(56) References Cited

U.S. PATENT DOCUMENTS

| | | | | |
|---|---|---|---|---|
| 4,486,372 | A * | 12/1984 | Millard | B29C 33/0033 |
| | | | | 156/242 |
| 4,666,546 | A | 5/1987 | Treber | |
| 4,747,895 | A * | 5/1988 | Wallerstein | B26D 7/086 |
| | | | | 156/252 |
| 5,252,279 | A * | 10/1993 | Gore | B29C 70/545 |
| | | | | 264/154 |
| 5,735,984 | A * | 4/1998 | Hoff | B29C 59/046 |
| | | | | 156/253 |
| 5,879,494 | A * | 3/1999 | Hoff | B26D 7/086 |
| | | | | 156/253 |
| 6,106,646 | A * | 8/2000 | Fairbanks | B29C 66/8322 |
| | | | | 156/253 |
| 6,190,602 | B1 * | 2/2001 | Blaney | B26D 7/086 |
| | | | | 156/303.1 |
| 6,451,241 | B1 * | 9/2002 | Ohliger | B29C 70/44 |
| | | | | 264/156 |
| 7,695,799 | B2 * | 4/2010 | Cree | A61F 13/512 |
| | | | | 156/251 |
| 8,696,965 | B2 * | 4/2014 | Bongiovanni | B29C 37/0064 |
| | | | | 156/286 |
| 8,752,293 | B2 * | 6/2014 | Jones | B29C 70/30 |
| | | | | 156/196 |
| 8,916,010 | B2 * | 12/2014 | Brennan | B29C 70/30 |
| | | | | 156/123 |
| 9,259,879 | B2 * | 2/2016 | Roman | D03D 13/004 |
| 2003/0219578 | A1 * | 11/2003 | Jones | B29C 70/46 |
| | | | | 428/292.1 |
| 2007/0149080 | A1 * | 6/2007 | Asahara | B29B 11/16 |
| | | | | 442/239 |
| 2010/0098906 | A1 * | 4/2010 | Bongiovanni | B29C 37/0064 |
| | | | | 428/138 |
| 2010/0199827 | A1 | 8/2010 | Colegrove | |
| 2010/0280471 | A1 * | 11/2010 | Shah | A61F 13/15731 |
| | | | | 604/367 |
| 2011/0240617 | A1 * | 10/2011 | Xu | B23K 26/00 |
| | | | | 219/121.72 |
| 2013/0037198 | A1 | 2/2013 | Safai et al. | |
| 2014/0174632 | A1 * | 6/2014 | Roman | D03D 13/004 |
| | | | | 156/87 |
| 2014/0174641 | A1 * | 6/2014 | Roman | D03D 13/004 |
| | | | | 156/182 |
| 2014/0349062 | A1 * | 11/2014 | Chandrasekaran | B29C 55/143 |
| | | | | 428/99 |
| 2014/0349079 | A1 * | 11/2014 | Chandrasekaran | B32B 37/144 |
| | | | | 428/159 |
| 2016/0243767 | A1 * | 8/2016 | Humfeld | B29C 70/30 |

FOREIGN PATENT DOCUMENTS

| | | |
|---|---|---|
| EP | 2730914 A1 | 5/2014 |
| JP | 2007131654 A * | 5/2007 |
| WO | 2012052272 A1 | 4/2012 |

* cited by examiner

SYSTEMS AND METHODS FOR MAKING INDEXED PREPREG COMPOSITE SHEETS AND LAMINATED COMPOSITE ARTICLES

BACKGROUND

At least some known laminated composite articles are made from shaped charges of prepreg composite material that includes reinforcement fibers, such as carbon fibers, pre-impregnated with resin. The charges, each approximating the shape of the part, are cut from prepreg plies using high-cost computer-numerically-controlled ("CNC") equipment and must be stacked manually with much care to achieve the requisite alignment of the reinforcement fibers within the part, which increases process cycle time and manufacturing cost.

Moreover, the ability to achieve the requisite alignment of the reinforcement fibers within the stack is limited in many cases, at least in part because the prepreg composite material is tacky, causing difficulty in aligning the edges of each successive charge during layup. Misalignment of the charge edges leads to corresponding misalignment in relative fiber orientations between adjacent charges in the stack, resulting in a final part that may not meet design specifications for strength and stiffness.

SUMMARY

Accordingly, apparatuses and methods, intended to address the above-identified concerns, would find utility.

The following is a non-exhaustive list of examples, which may or may not be claimed, of the subject matter according the present disclosure.

One example of the present disclosure relates to a system for making an indexed prepreg composite sheet. The system comprises a conveyor system configured to feed a resin film layer and a fiber reinforcement downstream along a machine direction. The system also comprises a region forming apparatus configured to form discrete regions in the resin film layer. The discrete regions are arranged in an indexing pattern. The system additionally comprises a calendaring apparatus disposed downstream from the forming apparatus in the machine direction. The calendaring apparatus is configured to form a precursor prepreg composite sheet by impregnating the fiber reinforcement with the resin film layer having a viscosity. The discrete regions of the resin film layer form non-impregnated regions of the precursor prepreg composite sheet. The system also comprises a region removal apparatus disposed downstream from the calendaring apparatus in the machine direction. The region removal apparatus is configured to replace the non-impregnated regions of the precursor prepreg composite sheet with indexing openings.

Another example of the present disclosure relates to a method of making an indexed prepreg composite sheet. The method comprises forming discrete regions in a resin film layer. The discrete regions are arranged in an indexing pattern. The method also includes forming a precursor prepreg composite sheet by impregnating a fiber reinforcement with the resin film layer having a viscosity. The discrete regions of the resin film layer form non-impregnated regions of the precursor prepreg composite sheet. The method additionally includes replacing the non-impregnated regions of the precursor prepreg composite sheet with indexing openings.

Yet another example of the present disclosure relates to a method of making a laminated precursor article comprising layers having predetermined ideal orientation directions of fibers within the laminated precursor article. The method comprises providing at least one indexed prepreg composite sheet comprising the fibers having a longitudinal direction and sets of indexing openings 306. Each of the sets of the indexing openings are arranged in an indexing pattern oriented at one of pattern angles relative to the longitudinal direction of the fibers. The indexing pattern corresponds to a guide pattern of guides in a tool. The method also includes separating at least a portion of the at least one indexed prepreg composite sheet into sub-sheets corresponding to the layers of the laminated precursor article. Each of the sub-sheets comprises one of the sets of the indexing openings at one of the pattern angles relative to the longitudinal direction of the fibers. The method further includes stacking the sub-sheets in a stacking sequence by aligning the indexing openings of each of the sub-sheets with the guides of the tool and inserting the guides through the indexing openings.

BRIEF DESCRIPTION OF THE DRAWINGS

Figure 1A:
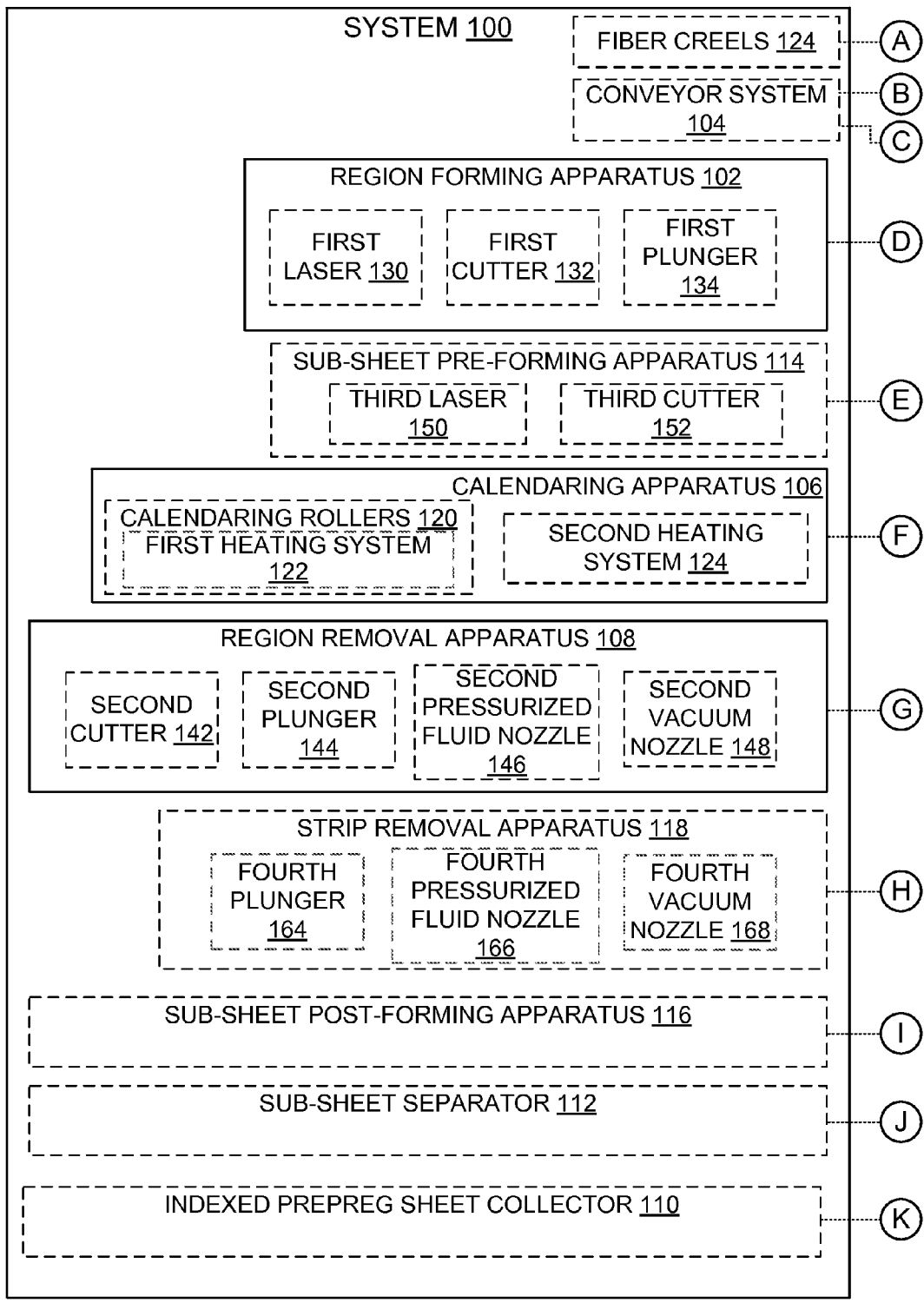
Figure 1B:
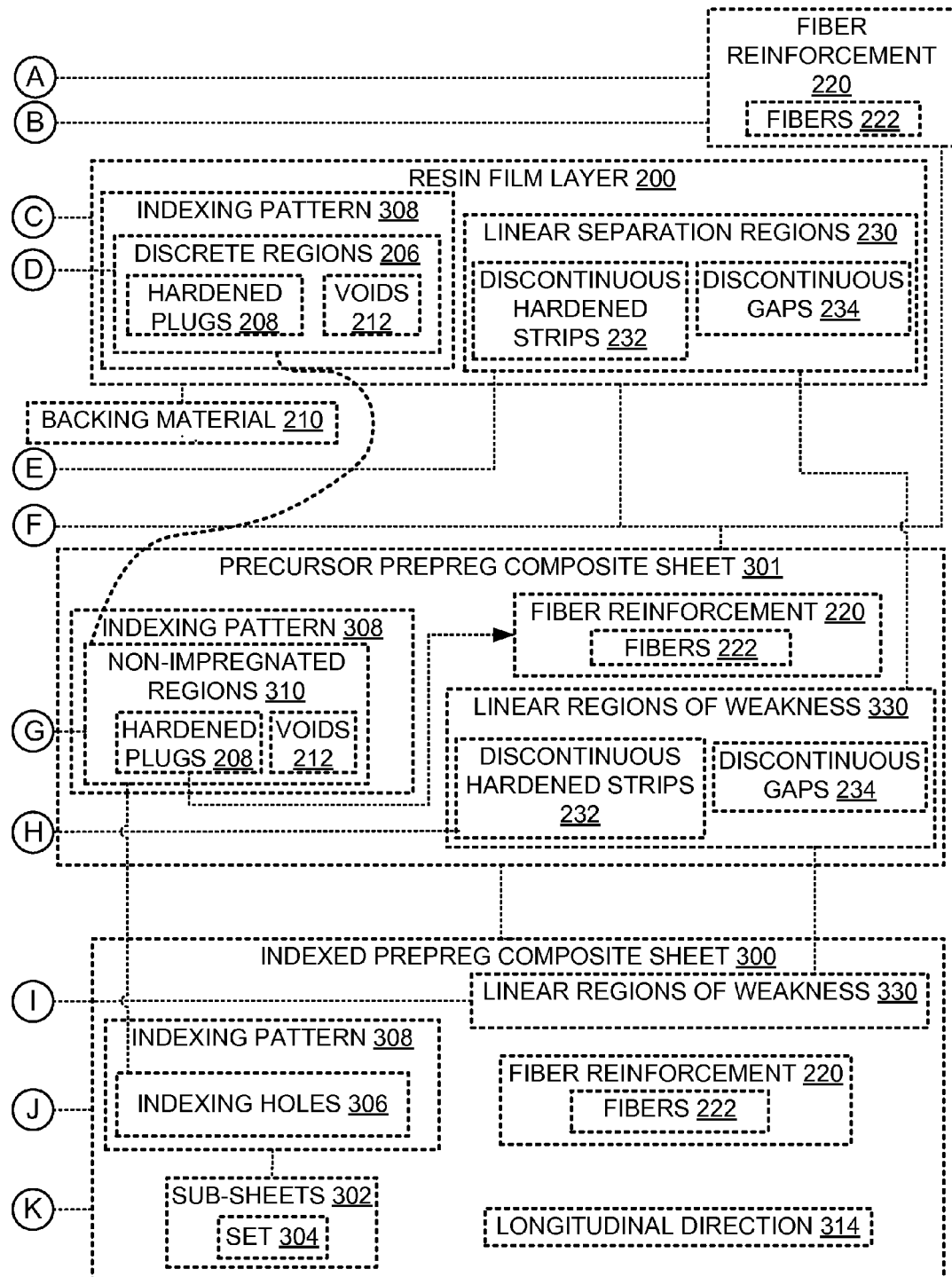
Figure 2:
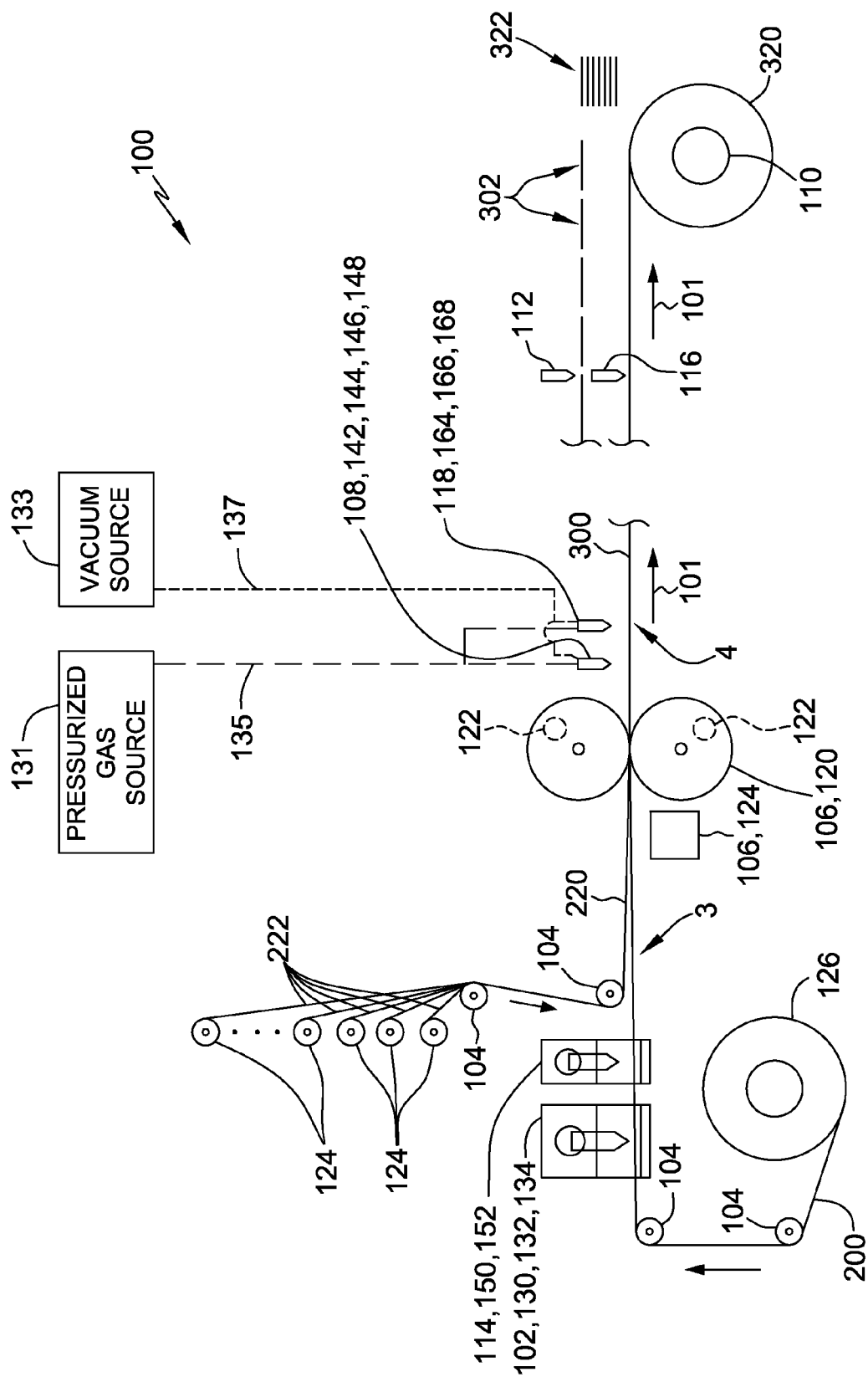
Figure 3A:
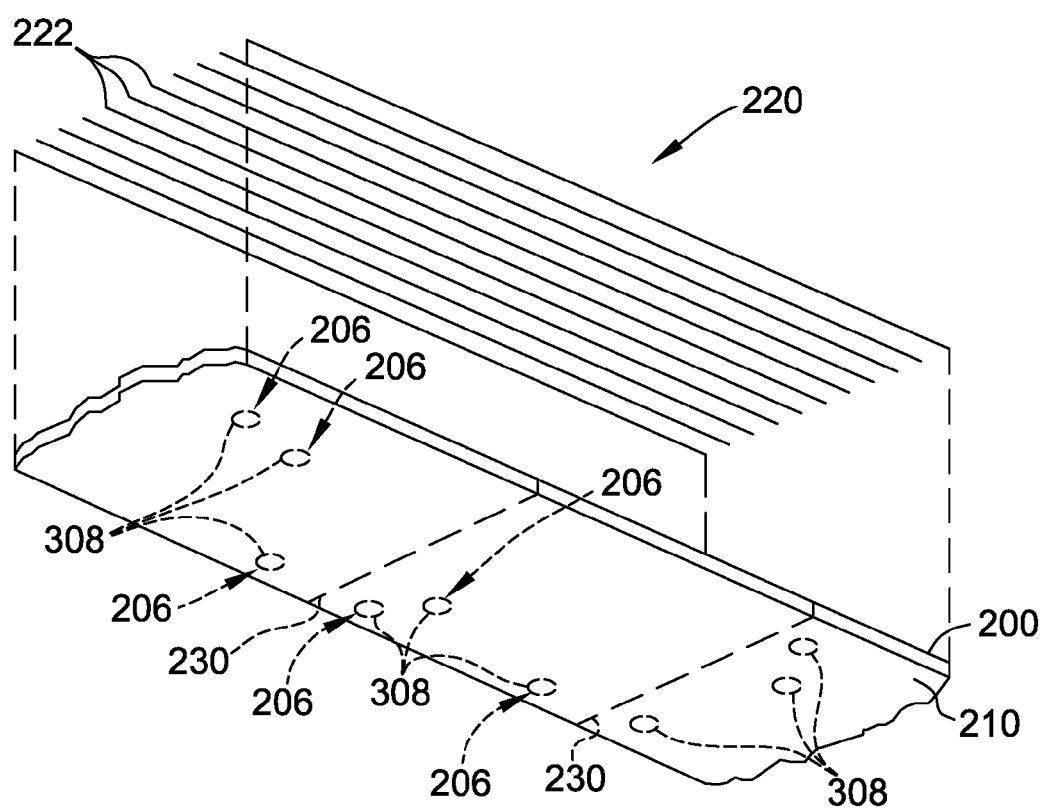
Figure 3B:
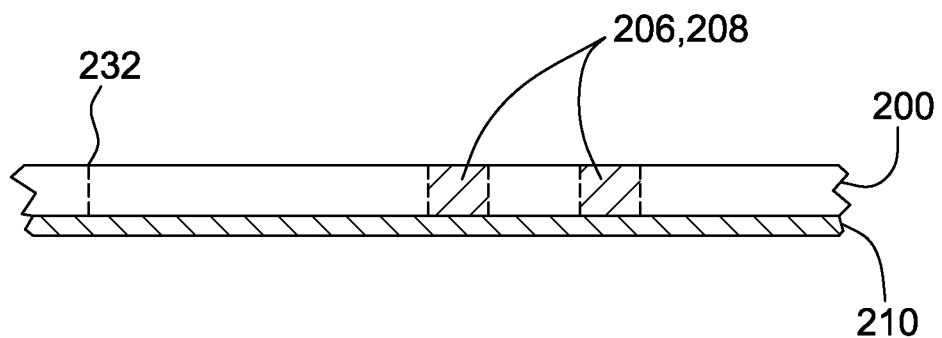
Figure 3C:
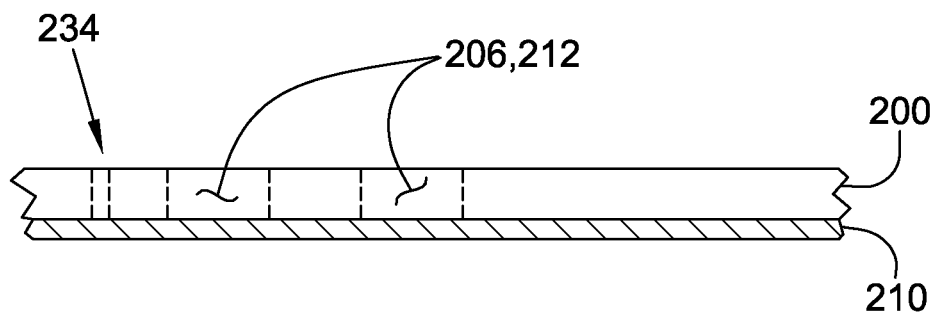
Figure 3D:
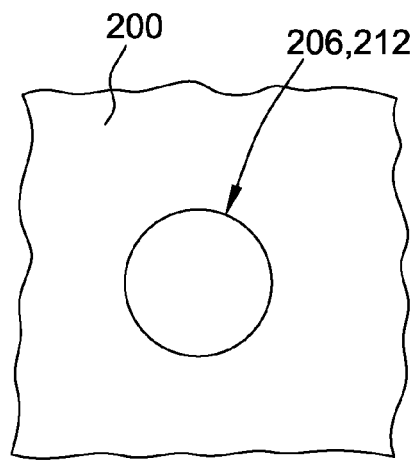
Figure 4D:
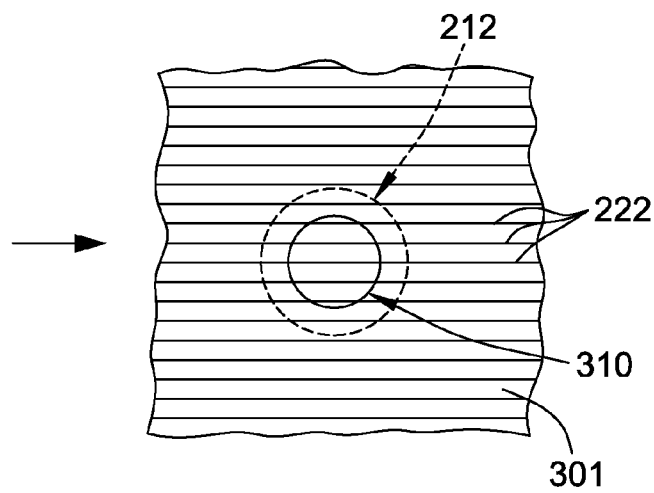
Figure 4A:
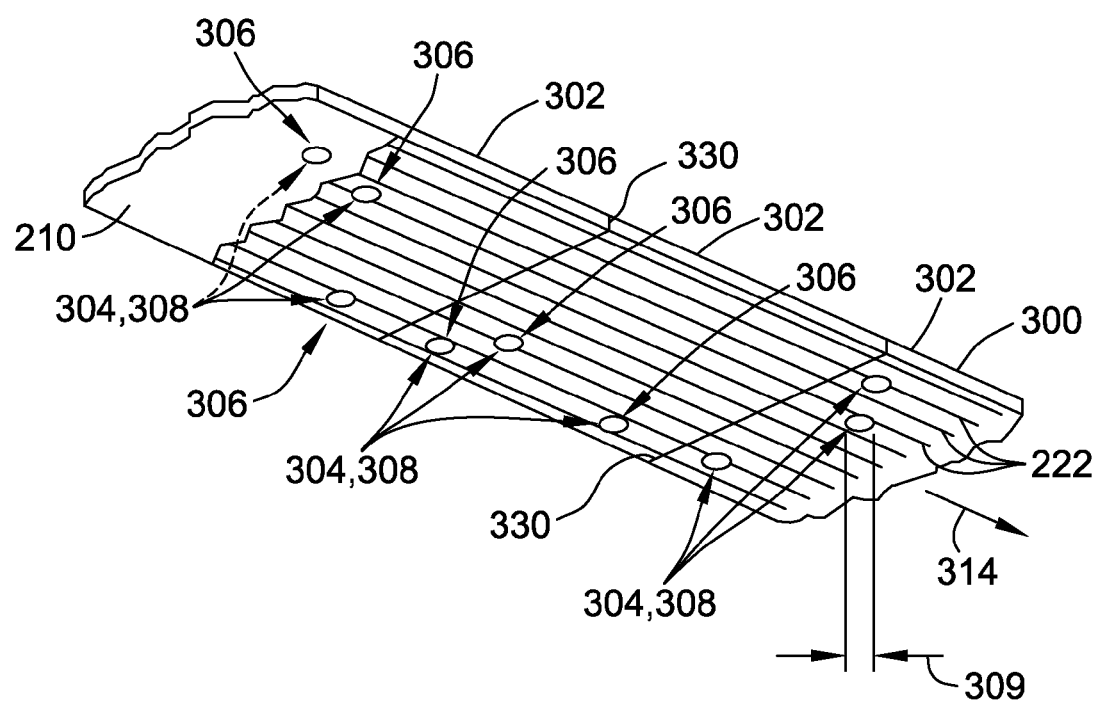
Figure 4B:
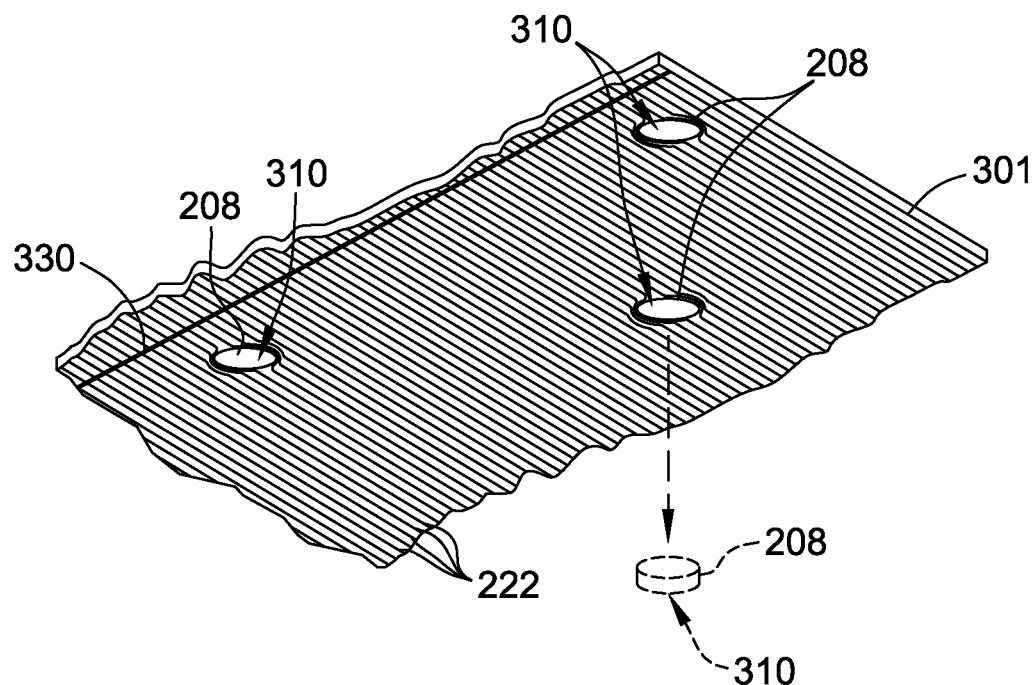
Figure 4C:
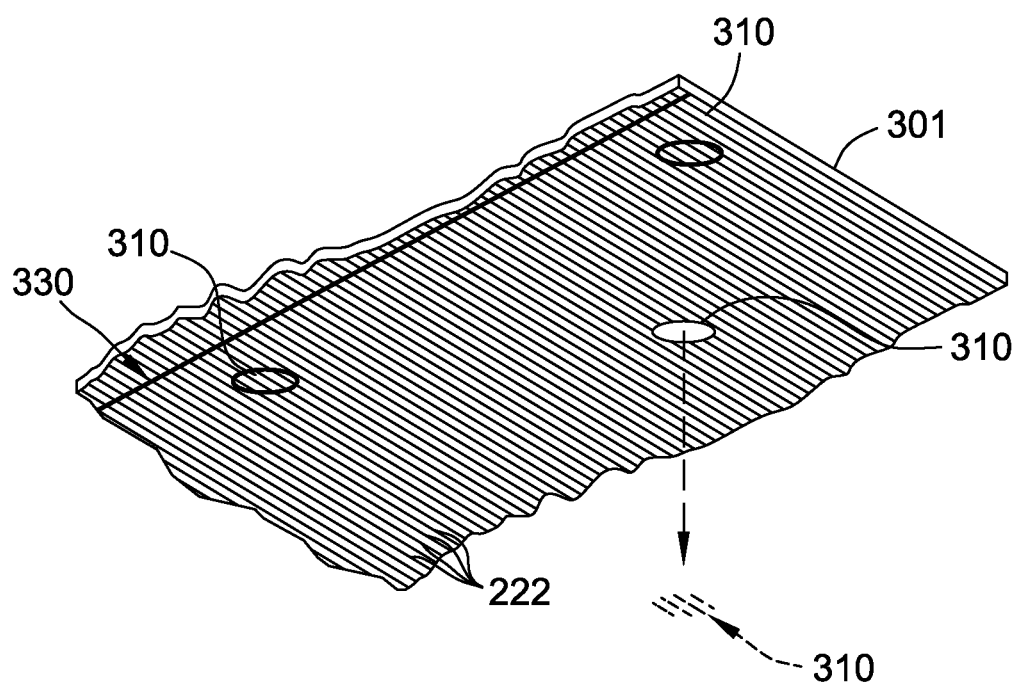
Figure 4E:
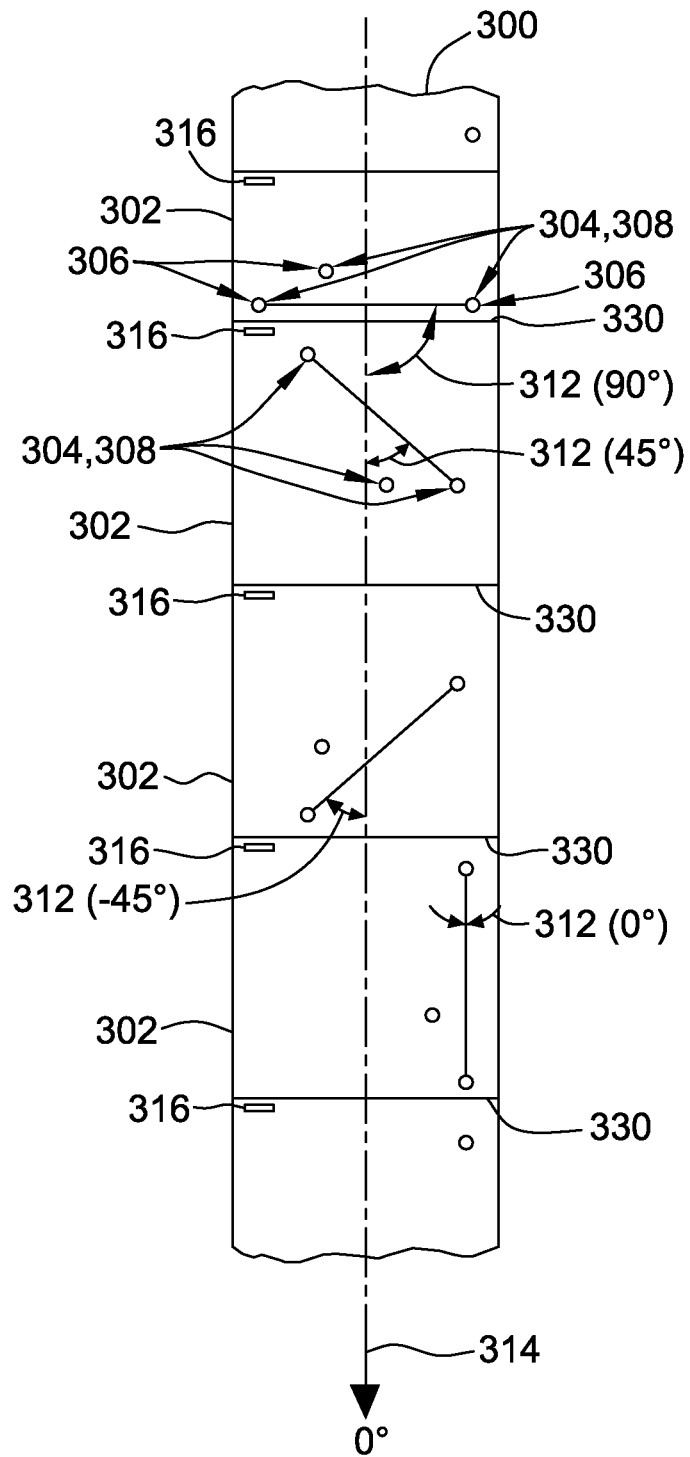
Figure 5:
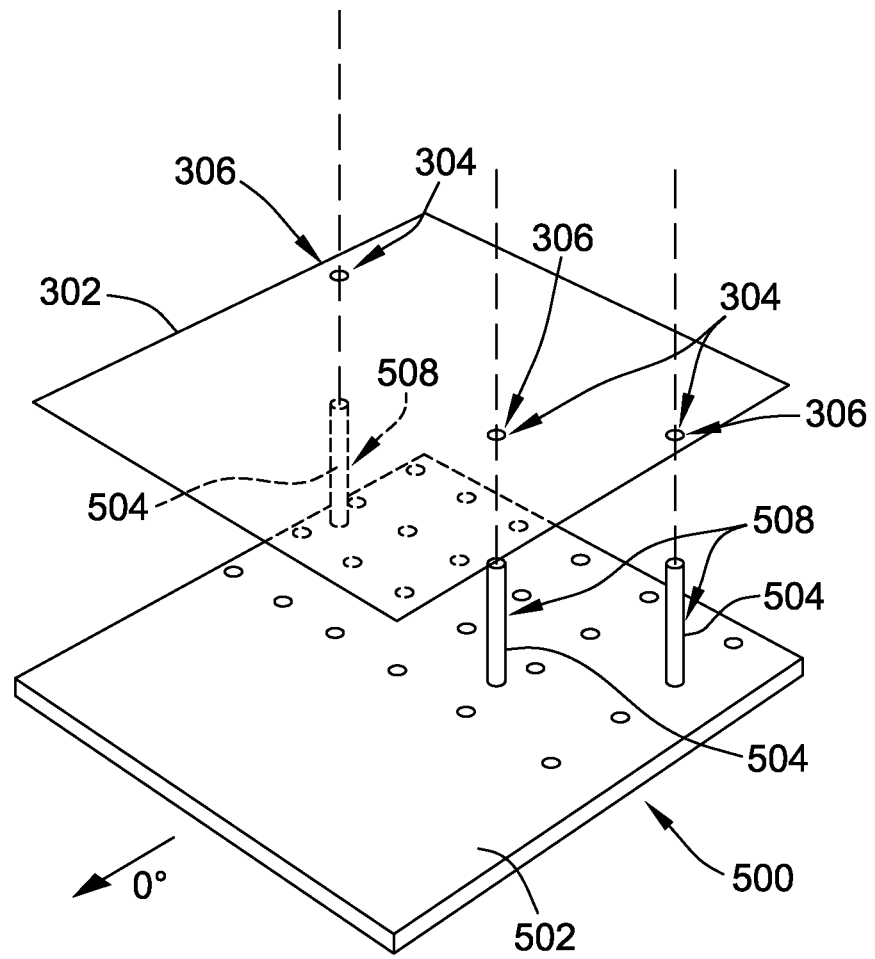
Figure 6:
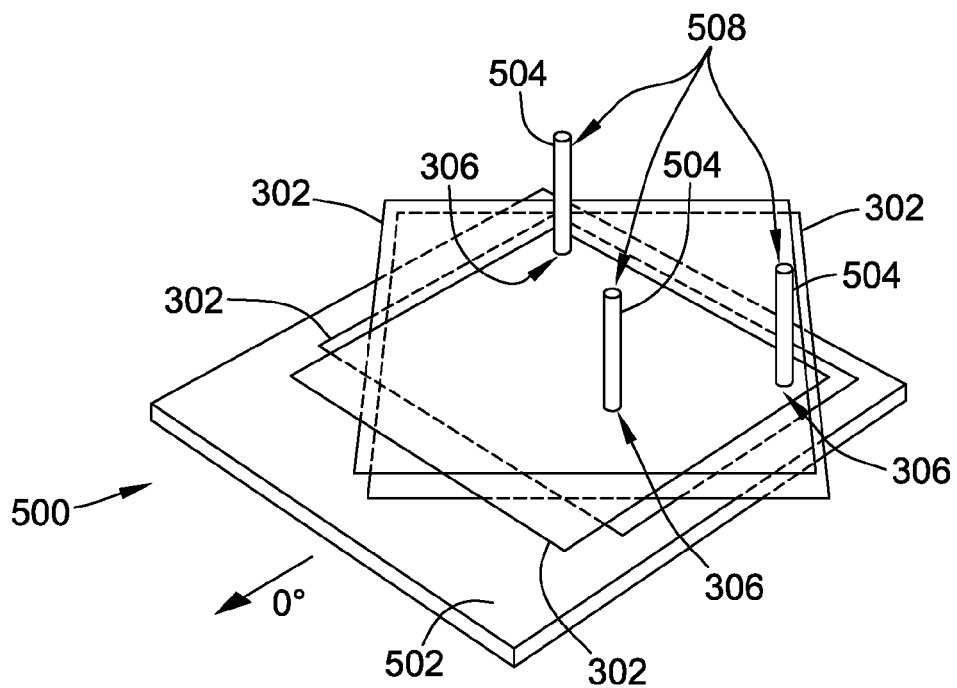
Figure 7:
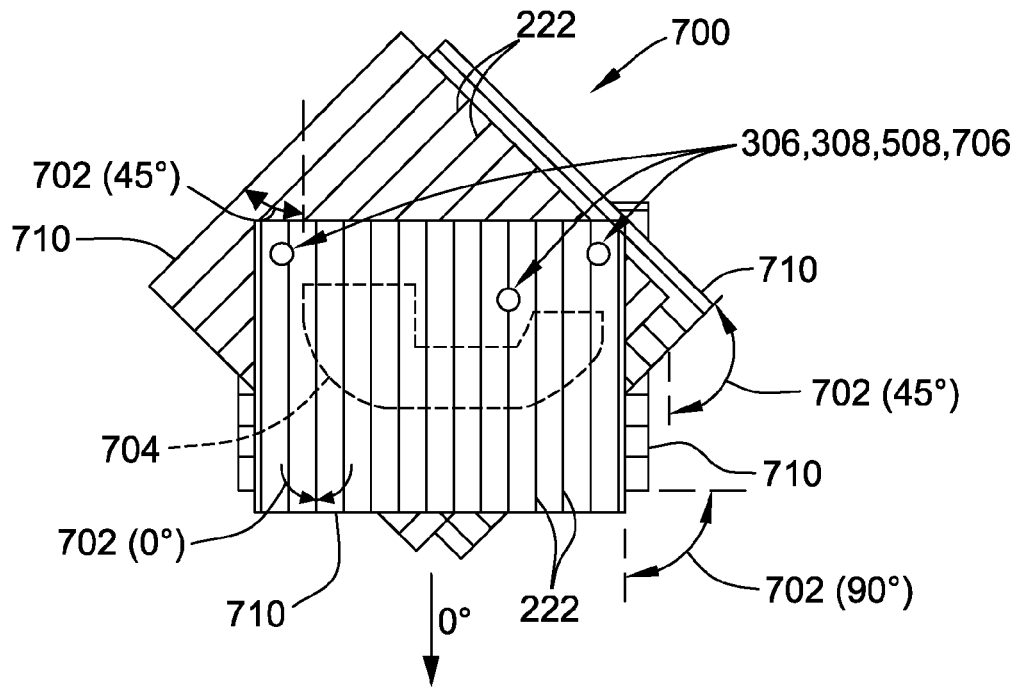
Figure 8:
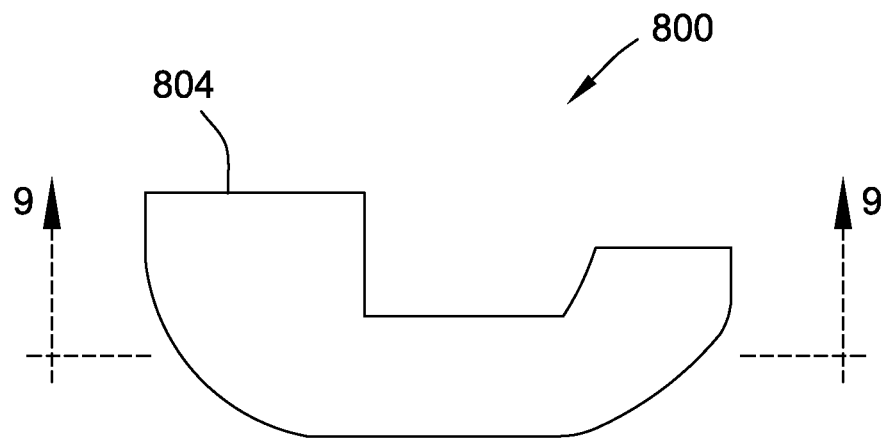
Figure 9:
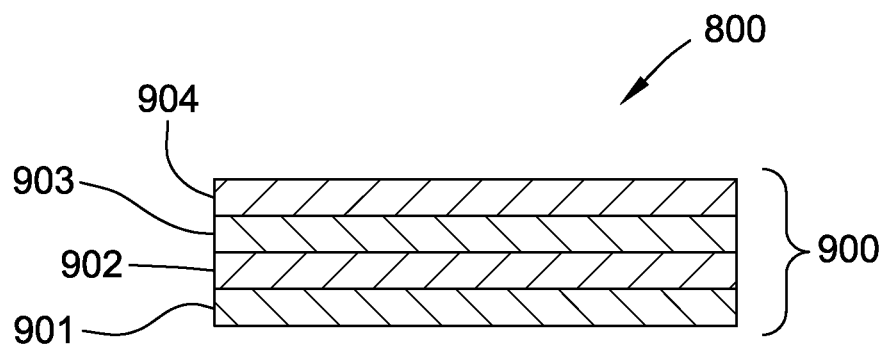
Figure 10A:
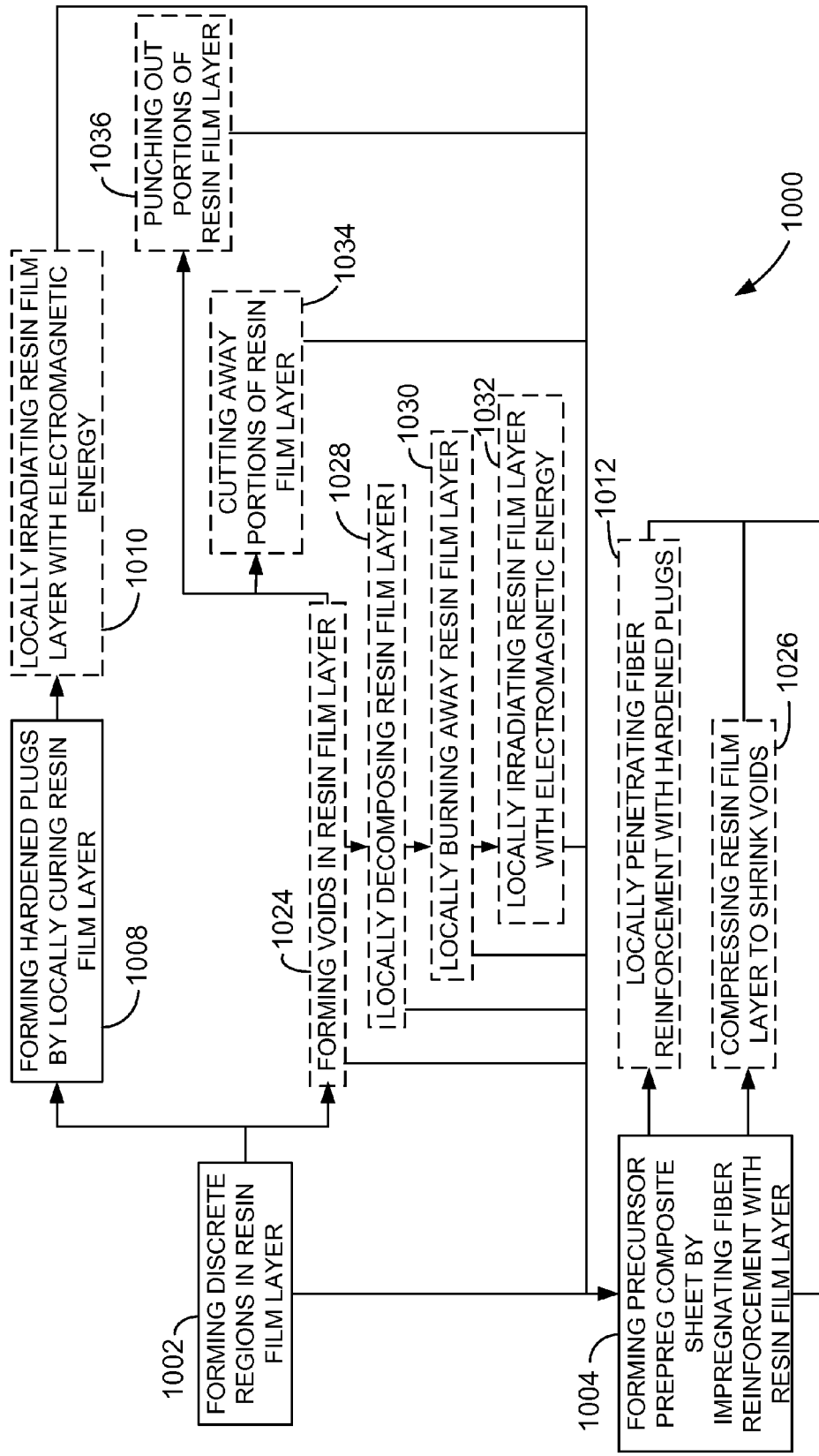

Having thus described examples of the present disclosure in general terms, reference will now be made to the accompanying drawings, which are not necessarily drawn to scale, and wherein like reference characters designate the same or similar parts throughout the several views, and wherein:

FIG. 1A is a first portion of a block diagram of a system for making an indexed prepreg composite sheet, according to one or more examples of the present disclosure;

FIG. 1B is a second portion of the block diagram of the system for making the indexed prepreg composite sheet, according to one or more examples of the present disclosure;

FIG. 2 is a schematic view of the system of FIG. 1A, according to one or more examples of the present disclosure;

FIG. 3A is a schematic perspective view of a resin film layer and a fiber reinforcement capable of being processed by the system of FIG. 2, as viewed at location 3 designated in FIG. 2, according to one or more examples of the present disclosure;

FIG. 3B is a schematic side view of the resin film layer of FIG. 3A, according to one or more examples of the present disclosure;

FIG. 3C is a schematic side view of the resin film layer of FIG. 3A, according to one or more examples of the present disclosure;

FIG. 3D is a schematic top view of the resin film layer of FIG. 3C, according to one or more examples of the present disclosure;

FIG. 4A is a schematic perspective view of an indexed prepreg composite sheet capable of being formed by the system of FIG. 2, as viewed at location 4 designated in FIG. 2, according to one or more examples of the present disclosure;

FIG. 4B is a schematic perspective view of a precursor prepreg composite sheet capable of being processed by the system of FIG. 2, according to one or more examples of the present disclosure;

FIG. 4C is a schematic perspective view of a precursor prepreg composite sheet capable of being processed by the system of FIG. 2, according to one or more examples of the present disclosure;

FIG. 4D is a schematic top view of the precursor prepreg composite sheet of FIG. 4C, according to one or more examples of the present disclosure;

FIG. 4E is a schematic top view of the indexed prepreg composite sheet of FIG. 4A, according to one or more examples of the present disclosure;

FIG. 5 is a schematic perspective view of the tool of FIG. 1B, according to one or more examples of the present disclosure;

FIG. 6 is a schematic perspective view of a plurality of sub-sheets formed from the indexed prepreg composite sheet of FIG. 4A stacked on the tool of FIG. 5, according to one or more examples of the present disclosure;

FIG. 7 is a schematic top view of a laminate precursor article formed using the tool of FIG. 5, according to one or more examples of the present disclosure;

FIG. 8 is a schematic top view of a laminate composite article formed from the laminate precursor article of FIG. 7, according to one or more examples of the present disclosure;

FIG. 9 is a schematic section view of the laminate composite article of FIG. 8, according to one or more examples of the present disclosure;

FIG. 10A is a first portion of a block diagram of a method of making an indexed prepreg composite sheet, according to one or more examples of the present disclosure.

Figure 10B:
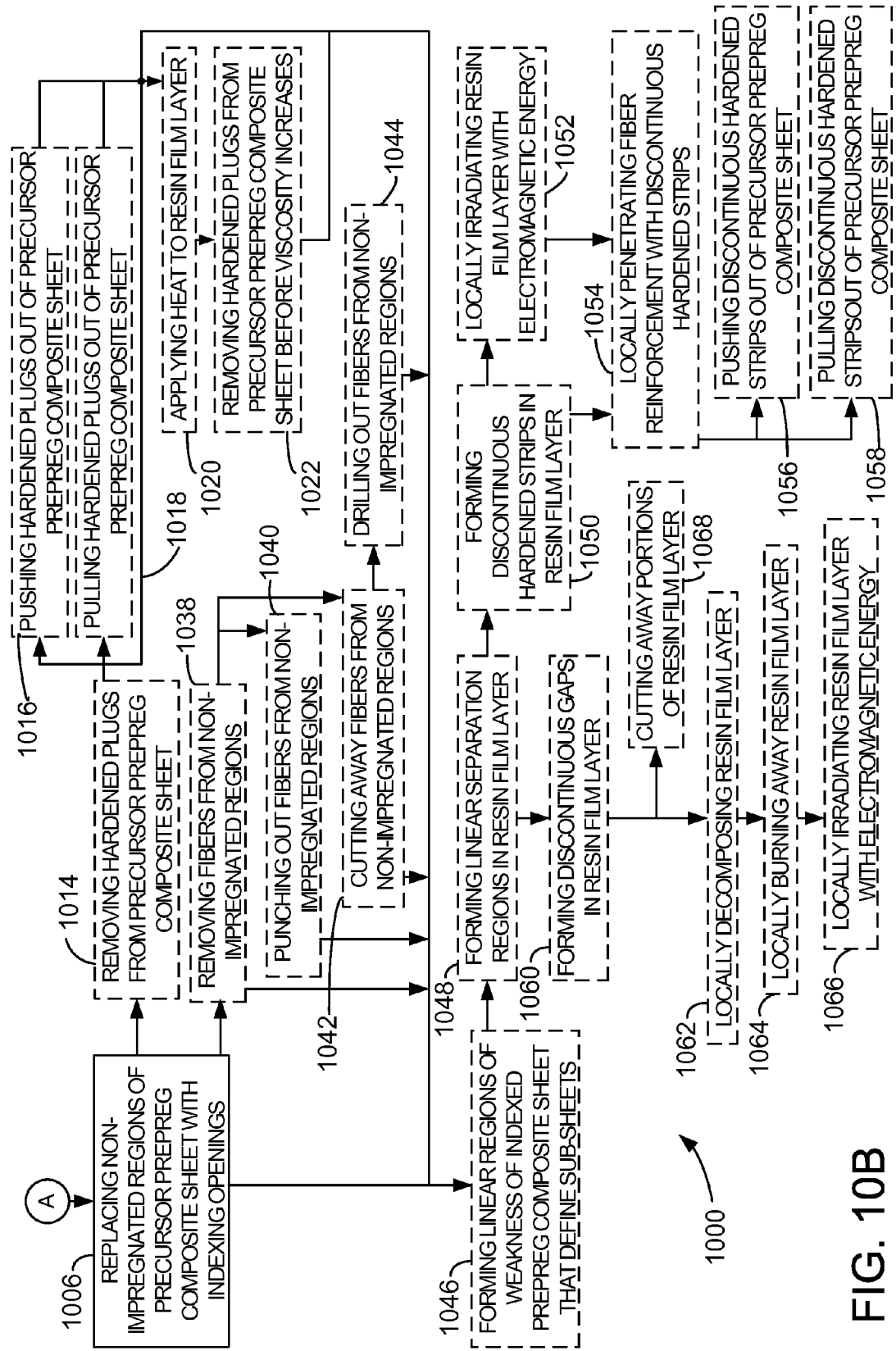

FIG. 10B is a second portion of the block diagram of the method of making an indexed prepreg composite sheet, according to one or more examples of the present disclosure.

Figure 11:
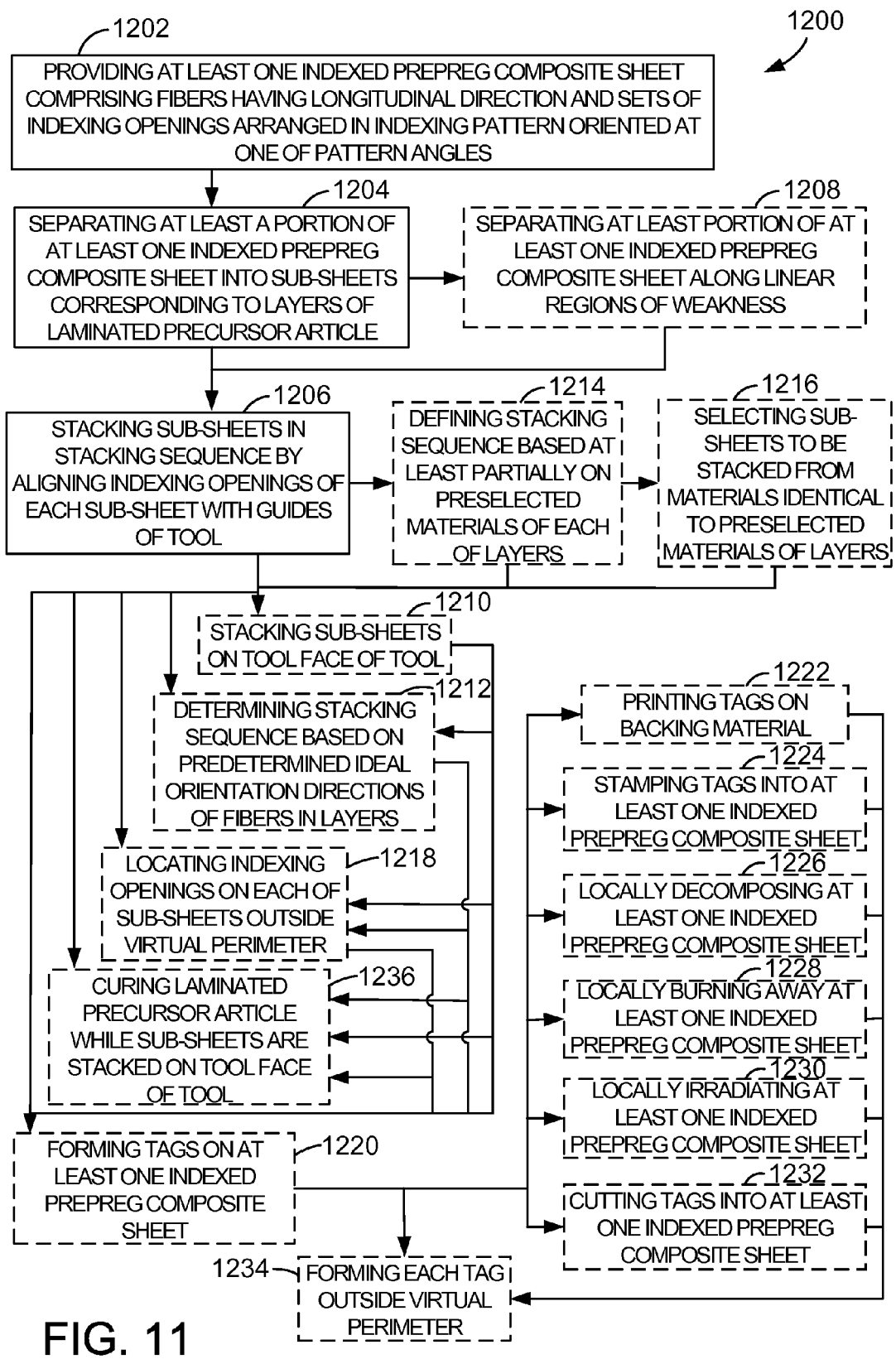

FIG. 11 is a block diagram of a method of making a laminate precursor article, according to one or more examples of the present disclosure.

Figure 12:
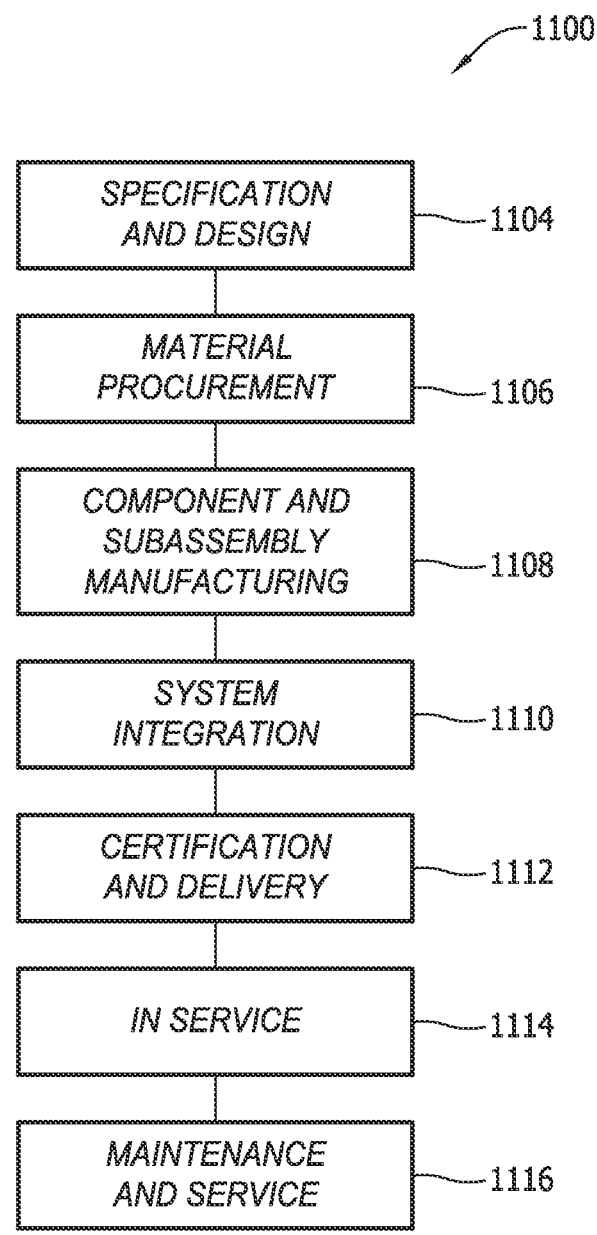

FIG. 12 is a block diagram of aircraft production and service methodology; and

Figure 13:
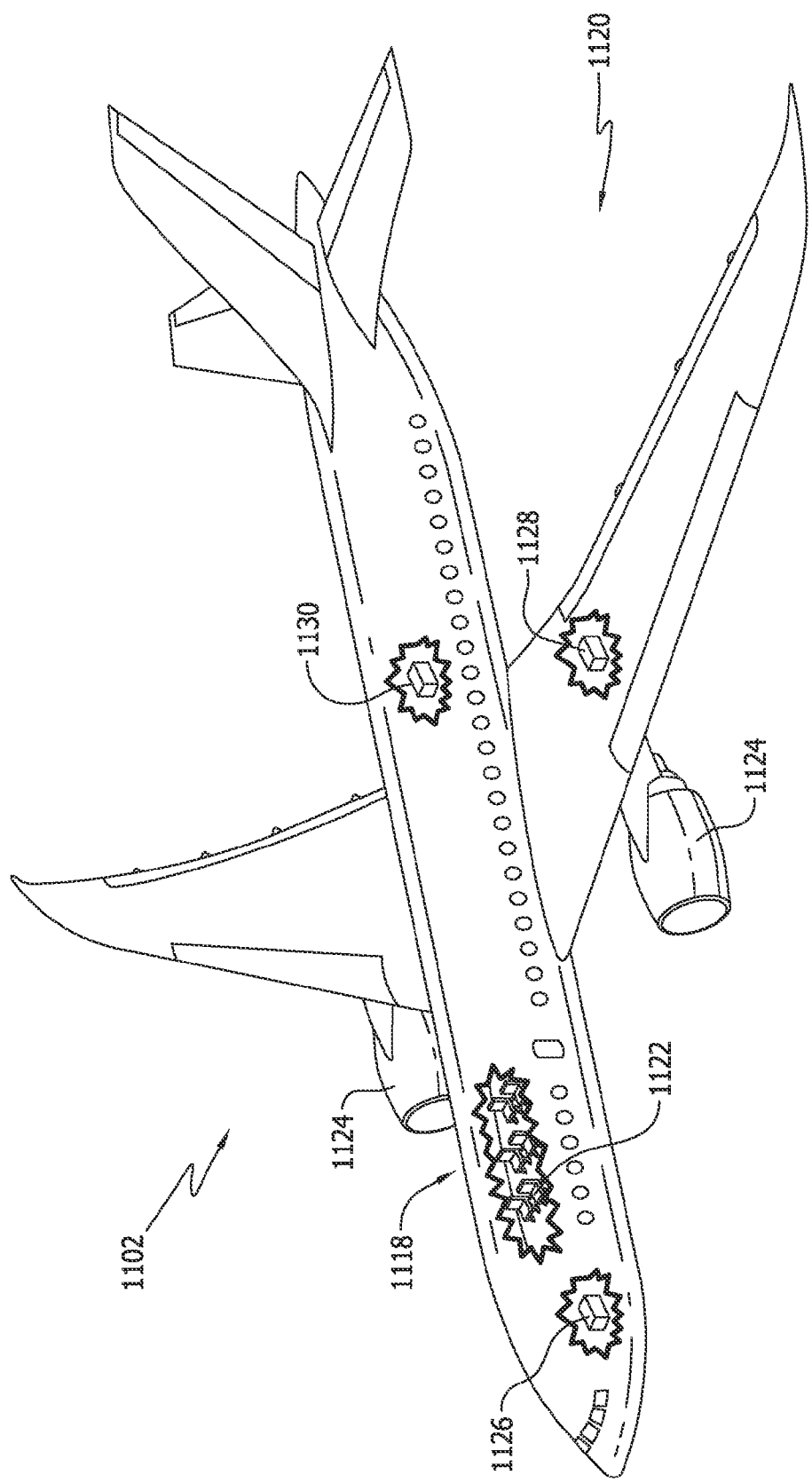

FIG. 13 is a schematic illustration of an aircraft.

DETAILED DESCRIPTION

In FIGS. 1A and 1B, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships between the various disclosed elements are necessarily represented. Accordingly, couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional examples of the present disclosure. Likewise, elements and/or components, if any, represented with dashed lines, indicate alternative or optional examples of the present disclosure. Environmental elements, if any, are represented with dotted lines. Virtual (imaginary) elements may also be shown for clarity. Those skilled in the art will appreciate that some of the features illustrated in FIGS. 1A and 1B may be combined in various ways without the need to include other features described in FIGS. 1A and 1B, other drawing figures, and/or the accompanying disclosure, even though such combination or combinations are not explicitly illustrated herein. Similarly, additional features not limited to the examples presented, may be combined with some or all of the features shown and described herein.

In FIGS. 10A, 10B, 11, and 12, referred to above, the blocks may represent operations and/or portions thereof and lines connecting the various blocks do not imply any particular order or dependency of the operations or portions thereof. FIGS. 10A, 10B, 11, and 12 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according the present disclosure are provided below.

Referring e.g., to FIGS. 1A, 1B, 2, 3A, 3B, 3C, 3D, 4A, 4B, 4C, and 4D, system 100 for making indexed prepreg composite sheet 300 is disclosed. System 100 comprises conveyor system 104 configured to feed resin film layer 200 and fiber reinforcement 220 downstream along machine direction 101. System 100 also comprises region forming apparatus 102 configured to form discrete regions 206 in resin film layer 200. Discrete regions 206 are arranged in indexing pattern 308. System 100 additionally comprises calendaring apparatus 106 disposed downstream from forming apparatus 102 in machine direction 101. Calendaring apparatus 106 is configured to form precursor prepreg composite sheet 301 by impregnating fiber reinforcement 220 with resin film layer 200 having a viscosity. Discrete regions 206 of resin film layer 200 form non-impregnated regions 310 of precursor prepreg composite sheet 301. System 100 also comprises region removal apparatus 108 disposed downstream from calendaring apparatus 106 in machine direction 101. Region removal apparatus 108 is configured to replace non-impregnated regions 310 of precursor prepreg composite sheet 301 with indexing openings 306. The preceding subject matter of the instant paragraph is in accordance with example 1 of the present disclosure.

Indexing openings 306 arranged in indexing pattern 308 are configured to cooperate with guides 504 of tool 500 (shown in FIG. 5) to increase accuracy of alignment of fibers 222 in layers 710 of laminated precursor article 700 (shown in FIG. 7) with predetermined ideal orientation directions of fibers 222, as will be further described herein. In addition, indexing openings 306 arranged in indexing pattern 308 are formed when indexed prepreg composite sheet 300 is formed, such as by a supplier of prepreg sheet material, thus reducing a time and labor burden on an end user of indexed prepreg composite sheet 300.

For example, but not by way of limitation, conveyor system 104 is suitably configured to receive fibers 222, such as from fiber creels 124, arrange fibers 222 into fiber reinforcement 220, and convey fiber reinforcement 220 in machine direction 101 to calendaring apparatus 106. For example, but not by way of limitation, conveyor system 104 is suitably configured to receive resin film layer 200, such as from standard roll 126 of resin film sheet 200, and convey resin film sheet 200 in machine direction 101 to calendaring apparatus 106. For example, but not by way of limitation, conveyor system 104 is suitably configured to receive precursor prepreg composite sheet 301 from calendaring apparatus 106 and convey precursor prepreg composite sheet 301 in machine direction 101 to region forming apparatus 108. For example, but not by way of limitation, conveyor system 104 is suitably configured to receive indexed prepreg composite sheet 300 from region removal apparatus 108 and convey indexed prepreg composite sheet 300 into a suitable finished configuration, such as rolled configuration 320, or to convey indexed prepreg composite sheet 300 through a sub-sheet separation apparatus 112 into a suitable stacked configuration 322 of sub-sheets 302.

Referring generally to FIGS. 1A, 1B, and 2 and particularly to e.g. FIG. 3B, the instant paragraph pertains to example 2 of the present disclosure. According to example 2, which includes the subject matter of example 1, above, region forming apparatus 102 comprises first laser 130 configured to form hardened plugs 208 by locally curing resin film layer 200.

Forming hardened plugs 208 using first laser 130 enables accurate placement of discrete regions 206, and enables formation of discrete regions 206 with little or no debris.

For example, but not by way of limitation, first laser 130 is a computer numerically controlled ("CNC") device that is programmed to direct electromagnetic energy for a predetermined time at each discrete region 206 to locally cure resin film layer 200 sufficiently to form hardened plugs 208 of resin at each discrete region 206. For another example, but not by way of limitation, hardened plugs 208 of resin substantially prevent impregnation of fiber reinforcement 220 with resin film layer 200 within discrete regions 206 during subsequent formation of indexed prepreg composite sheet 300.

Referring generally to FIGS. 1A, 1B, and 2 and particularly to e.g. FIG. 3C, the instant paragraph pertains to example 3 of the present disclosure. According to example 3, which includes the subject matter of example 1, above, region forming apparatus 102 comprises first laser 130 configured to form voids 212 in resin film layer 200.

Forming voids 212 using first laser 130 enables accurate placement of discrete regions 206 with little or no disruption of fiber reinforcement 220.

For example, but not by way of limitation, first laser 130 is a CNC device that is programmed to direct electromagnetic energy for a predetermined time at each discrete region 206 to locally decompose resin film layer 200 sufficiently to form voids 212 at each discrete region 206. For another example, but not by way of limitation, voids 212 substantially prevent impregnation of fiber reinforcement 220 with resin film layer 200 within discrete regions 206 during subsequent formation of indexed prepreg composite sheet 300.

Referring generally to FIGS. 1A, 1B, and 2 and particularly to e.g. FIG. 3C, the instant paragraph pertains to example 4 of the present disclosure. According to example 4, which includes the subject matter of example 1, above, region forming apparatus 102 comprises first cutter 132 configured to form voids 212 in resin film layer 200.

Forming voids 212 using first cutter 132 enables accurate placement of discrete regions 206 with decreased equipment and energy costs as compared to use and maintenance of a laser-based device.

For example, but not by way of limitation, first cutter 132 is a CNC device that is programmed to cut away resin film layer 200, such as using a drill, a blade, or another suitable cutting surface, from each discrete region 206 sufficiently to form voids 212 at each discrete region 206.

Referring generally to FIGS. 1A, 1B, and 2 and particularly to e.g. FIG. 3C, the instant paragraph pertains to example 5 of the present disclosure. According to example 5, which includes the subject matter of example 1, above, region forming apparatus 102 comprises first plunger 134 configured to form voids 212 in resin film layer 200.

Forming voids 212 using first plunger 134 enables accurate placement of discrete regions 206 with decreased equipment and energy costs as compared to use and maintenance of a laser-based device, and with less debris as compared to a cutting device.

For example, but not by way of limitation, first plunger 134 is a CNC device that is programmed to punch out resin film layer 200 from each discrete region 206 to form voids 212 at each discrete region 206.

Referring generally to FIGS. 1A and 1B, and particularly to e.g. FIG. 2, the instant paragraph pertains to example 6 of the present disclosure. According to example 6, which includes the subject matter of any of examples 1 through 5, above, calendaring apparatus 106 comprises at least two calendaring rollers 120.

At least two calendaring rollers 120 facilitate forming precursor prepreg composite sheet 301 by impregnating fiber reinforcement 220 with resin film layer 200.

For example, but not by way of limitation, calendaring rollers 120 are positioned such that a gap is formed between their respective outer surfaces. For example, but not by way of limitation, the gap is sized to receive resin film layer 200 and fiber reinforcement 220 such that the respective outer surfaces of calendaring rollers 120 cooperate to exert a predetermined pressure on resin film layer 200 and fiber reinforcement 220 to facilitate impregnating fiber reinforcement 220 with resin film layer 200. For example, but not by way of limitation, the respective outer surfaces of calendaring rollers 120 each are rotatable to cooperate with conveyor system 104 to move fiber reinforcement 220, resin film layer 200, and precursor prepreg composite sheet 301 in machine direction 101.

Referring generally to FIGS. 1A and 1B, and particularly to e.g. FIG. 2, the instant paragraph pertains to example 7 of the present disclosure. According to example 7, which includes the subject matter of example 6, above, calendaring apparatus 106 comprises first heating system 122 configured to heat at least one of at least two calendaring rollers 120.

First heating system 122 facilitates forming precursor prepreg composite sheet 301 by facilitating impregnating fiber reinforcement 220 with resin film layer 200.

For example, but not by way of limitation, first heating system 122 transfers heat to resin film layer 200 sufficient to reduce the viscosity of resin film layer 200 to a predetermined level that facilitates impregnating fiber reinforcement 220 with resin film layer 200.

Referring generally to FIGS. 1A and 1B and particularly to e.g. FIG. 2, the instant paragraph pertains to example 8 of the present disclosure. According to example 8, which includes the subject matter of example 7, above, first heating system 122 is internal to at least one of at least two calendaring rollers 120.

First heating system 122 internal to at least one of at least two calendaring rollers 120 facilitates efficient and well-controlled heat transfer to resin film layer 200.

For example, but not by way of limitation, first heating system 122 includes heating elements proximate the outer surface of at least one of two calendaring rollers 120 to transfer heat from the outer surface to resin film layer 200.

Referring generally to FIGS. 1A and 1B and particularly to e.g. FIG. 2, the instant paragraph pertains to example 9 of the present disclosure. According to example 9, which includes the subject matter of example 8, above, calendaring apparatus 106 comprises second heating system 124 external to at least two calendaring rollers 120.

Second heating system 124 enables transfer of additional heat to resin film layer 200 in certain prepreg forming applications in which first heating system 122 internal to at least one of calendaring rollers 120 is not configured to supply a desired amount of heat.

For example, but not by way of limitation, second heating system 124 is located upstream, relative to machine direction 101, from calendaring rollers 120 and enables controlled preheating of resin film layer 200.

Referring generally to FIGS. 1A, 1B, 2, and 4A, and particularly to e.g. FIG. 4B, the instant paragraph pertains to example 10 of the present disclosure. According to example 10, which includes the subject matter of any of examples 1 and 2, above, region removal apparatus 108 comprises second plunger 144 configured to push hardened plugs 208 out of precursor prepreg composite sheet 301 to form indexing openings 306.

Pushing out hardened plugs 208 using second plunger 144 enables accurate removal of hardened plugs 208.

For example, but not by way of limitation, second plunger 144 is a CNC device that is programmed to push out hardened plugs 208 from precursor prepreg composite sheet 301. For another example, but not by way of limitation, second plunger 144 is operably coupled to a sensor system that is operable to locate hardened plugs 208 within precursor prepreg composite sheet 301. For another example, but not by way of limitation, the sensor system uses optical sensors to detect hardened plugs 208 within precursor prepreg composite sheet 301. For another example, but not by way of limitation, the sensor system uses any suitable system to detect hardened plugs 208 within precursor prepreg composite sheet 301 that enables second plunger 144 to function as described herein.

Referring generally to FIGS. 1A, 1B, 2, and 4A, and particularly to e.g. FIG. 4B, the instant paragraph pertains to example 11 of the present disclosure. According to example 11, which includes the subject matter of any of examples 1 and 2, above, region removal apparatus 108 comprises second pressurized fluid nozzle 146 configured to push hardened plugs 208 out of precursor prepreg composite sheet 301 to form indexing openings 306.

Pushing out hardened plugs 208 using second pressurized fluid nozzle 146 enables accurate removal of hardened plugs 208 with a decreased risk of physical damage to precursor prepreg composite sheet 301, relative to second plunger 144.

For example, but not by way of limitation, second pressurized fluid nozzle 146 is a CNC device that is programmed to push out hardened plugs 208 from precursor prepreg composite sheet 301. For another example, but not by way of limitation, second pressurized fluid nozzle 146 is in flow communication with pressurized gas source 131, and is operable to expel bursts of pressurized fluid to push out hardened plugs 208 from precursor prepreg composite sheet 301. For example, but not by way of limitation, pressurized gas source 131 is a source of compressed air. For another example, but not by way of limitation, second pressurized fluid nozzle 146 is operably coupled to a sensor system that is operable to locate hardened plugs 208 within precursor prepreg composite sheet 301. For another example, but not by way of limitation, the sensor system uses optical sensors to detect hardened plugs 208 within precursor prepreg composite sheet 301. For another example, but not by way of limitation, the sensor system uses any suitable system to detect hardened plugs 208 within precursor prepreg composite sheet 301 that enables second pressurized fluid nozzle 146 to function as described herein.

Referring generally to FIGS. 1A, 1B, 2, and 4A, and particularly to e.g. FIG. 4B, the instant paragraph pertains to example 12 of the present disclosure. According to example 12, which includes the subject matter of any of examples 1 and 2, above, region removal apparatus 108 comprises second vacuum nozzle 148 configured to pull hardened plugs 208 out of precursor prepreg composite sheet 301 to form indexing openings 306.

Pulling out hardened plugs 208 using second vacuum nozzle 148 enables accurate removal of hardened plugs 208 with a decreased risk of physical damage to precursor prepreg composite sheet 301, relative to second plunger 144.

For example, but not by way of limitation, second vacuum nozzle 148 is a CNC device that is programmed to pull out hardened plugs 208 from precursor prepreg composite sheet 301. For another example, but not by way of limitation, second vacuum nozzle 148 is in flow communication with vacuum source 133, and is operable to create a suction force to pull out hardened plugs 208 from precursor prepreg composite sheet 301. For example, but not by way of limitation, vacuum source 133 is a suitable vacuum pump. For another example, but not by way of limitation, second vacuum nozzle 148 is operably coupled to a sensor system that is operable to locate hardened plugs 208 within precursor prepreg composite sheet 301. For another example, but not by way of limitation, the sensor system uses optical sensors to detect hardened plugs 208 within precursor prepreg composite sheet 301. For another example, but not by way of limitation, the sensor system uses any suitable system to detect hardened plugs 208 within precursor prepreg composite sheet 301 that enables second vacuum nozzle 148 to function as described herein.

Referring generally to FIGS. 1A, 1B, 2, and 4A, and particularly to e.g. FIG. 4C, the instant paragraph pertains to example 13 of the present disclosure. According to example 13, which includes the subject matter of any of examples 1 and 3-5, above, fiber reinforcement 220 comprises fibers 222, and region removal apparatus 108 comprises second plunger 144 configured to punch out fibers 222 from non-impregnated regions 310 of precursor prepreg composite sheet 301 to form indexing openings 306.

Punching out fibers 222 using second plunger 144 enables accurate removal of fibers 222 from non-impregnated regions 310 to form indexing openings 306.

For example, but not be way of limitation, fibers 222 extend through non-impregnated regions 310 initially defined by voids 212, such that non-impregnated regions 310 are substantially devoid of resin. For another example, but not by way of limitation, second plunger 144 is a CNC device that is programmed to punch out fibers 222 from non-impregnated regions 310. For another example, but not by way of limitation, second plunger 144 is operably coupled to a sensor system that is operable to locate non-impregnated regions 310 within precursor prepreg composite sheet 301. For another example, but not by way of limitation, the sensor system uses optical sensors to detect non-impregnated regions 310 within precursor prepreg composite sheet 301. For another example, but not by way of limitation, the sensor system uses any suitable system to detect non-impregnated regions 310 within precursor prepreg composite sheet 301 that enables second plunger 144 to function as described herein.

Referring generally to FIGS. 1A, 1B, 2, and 4A, and particularly to e.g. FIG. 4C, the instant paragraph pertains to example 14 of the present disclosure. According to example 14, which includes the subject matter of any of examples 1 and 3-5, above, fiber reinforcement 220 comprises fibers 222, and region removal apparatus 108 comprises second cutter 142 configured to cut away fibers 222 from non-impregnated regions 310 of precursor prepreg composite sheet 301 to form indexing openings 306.

Cutting away fibers 222 using second cutter 142 enables accurate removal of fibers 222 from non-impregnated regions 310 to form indexing openings 306.

For example, but not by way of limitation, fibers 222 extend through non-impregnated regions 310 initially defined by voids 212, such that non-impregnated regions 310 are substantially devoid of resin. For another example, but not by way of limitation, second cutter 142 is a CNC device that is programmed to cut away fibers 222, such as using a drill, a blade, or another suitable cutting surface, from non-impregnated regions 310. For another example, but not by way of limitation, second cutter 142 is operably coupled to a sensor system that is operable to locate non-impregnated regions 310 within precursor prepreg composite sheet 301. For another example, but not by way of limitation, the sensor system uses optical sensors to detect non-impregnated regions 310 within precursor prepreg composite sheet 301. For another example, but not by way of limitation, the sensor system uses any suitable system to detect non-impregnated regions 310 within precursor prepreg composite sheet 301 that enables second cutter 142 to function as described herein.

Referring generally to FIGS. 1A, 1B, and 2, and particularly to e.g. FIGS. 3A and 4A, the instant paragraph pertains to example 15 of the present disclosure. According to example 15, which includes the subject matter of any of examples 1-14, above, system 100 further comprises a sub-sheet pre-forming apparatus 114 configured to form linear separation regions 230 in resin film layer 200. Calendaring apparatus 106 is further configured to cause linear separation regions 230 to form linear regions of weakness 330 of indexed prepreg composite sheet 300. Linear regions of weakness 330 define sub-sheets 302 of indexed prepreg composite sheet 300. Each of sub-sheets 302 comprises set 304 of indexing openings 306 arranged in indexing pattern 308.

Sub-sheets 302 are easily separable from indexed prepreg composite sheet 300 along pre-formed linear regions of weakness 330, such as by a supplier of prepreg sheet material or an end user, thus eliminating or reducing a step of measuring and cutting indexed prepreg composite sheet 300 by an end user of indexed prepreg composite sheet 300. Linear separation regions 230 pre-formed in resin film layer 200 subsequently cause linear regions of weakness 330 to form in indexed prepreg composite sheet 300 when indexed prepreg composite sheet 300 is formed, reducing or eliminating a step of measuring and cutting of indexed prepreg composite sheet 300 to obtain sub-sheets 302.

For example, but not by way of limitation, each sub-sheet 302 is configured to form a layer 710 of a laminated precursor article 700 (shown in FIG. 7).

Referring generally to FIGS. 1A, 1B, 2, 3A, and 4A, and particularly to e.g. FIG. 3B, the instant paragraph pertains to example 16 of the present disclosure. According to example 16, which includes the subject matter of example 15, above, sub-sheet pre-forming apparatus 114 comprises third laser 150 configured to form discontinuous hardened strips 232 in resin film layer 200 by locally curing resin film layer 200.

Forming discontinuous hardened strips 232 using third laser 150 enables accurate placement of linear separation regions 230, and enables formation of linear separation regions 230 with little or no debris.

For example, but not by way of limitation, third laser 150 is a CNC device that is programmed to direct electromagnetic energy for a predetermined time at each linear separation region 230 to locally cure resin film layer 200 sufficiently to form discontinuous hardened strips 232 at each linear separation region 230. For another example, but not by way of limitation, impregnation of fiber reinforcement 220 with resin film layer 200 is substantially prevented within the locally cured portions of discontinuous hardened strips 232 during subsequent formation of indexed prepreg composite sheet 300. The term "discontinuous" indicates that each discontinuous hardened strip 232 also includes at least one region in which resin film layer 200 is not locally cured, such that fiber reinforcement 220 is impregnated with resin film layer 200 within the at least one region of each discontinuous hardened strip 232 during subsequent formation of indexed prepreg composite sheet 300. For example, but not by way of limitation, each discontinuous hardened strip 232 is discontinuous to prevent indexed prepreg composite sheet 300 from separating prematurely along subsequently formed linear regions of weakness 330.

Referring generally to FIGS. 1A, 1B, 2, 3A, and 4A, and particularly to e.g. FIG. 3C, the instant paragraph pertains to example 17 of the present disclosure. According to example 17, which includes the subject matter of example 15, above, sub-sheet pre-forming apparatus 114 comprises third laser 150 configured to form discontinuous gaps 234 in resin film layer 200.

Forming discontinuous gaps 234 using third laser 150 enables accurate placement of discontinuous gaps 234 with little or no disruption of fiber reinforcement 220.

For example, but not by way of limitation, third laser 150 is a CNC device that is programmed to direct electromagnetic energy for a predetermined time at each linear separation region 230 to locally decompose resin film layer 200 sufficiently to form discontinuous gaps 234 at each linear separation region 230. For another example, but not by way of limitation, impregnation of fiber reinforcement 220 with resin film layer 200 is substantially prevented within the locally decomposed portions of discontinuous gaps 234 during subsequent formation of indexed prepreg composite sheet 300. The term "discontinuous" indicates that each discontinuous gap 234 also includes at least one region in which resin film layer 200 is not locally decomposed, such that fiber reinforcement 220 is impregnated with resin film layer 200 within the at least one region of each discontinuous gap 234 during subsequent formation of indexed prepreg composite sheet 300. For example, but not by way of limitation, each discontinuous gap 234 is discontinuous to prevent indexed prepreg composite sheet 300 from separating prematurely along subsequently formed linear regions of weakness 330.

Referring generally to FIGS. 1A, 1B, 2, 3A, and 4A, and particularly to e.g. FIG. 3C, the instant paragraph pertains to example 18 of the present disclosure. According to example 18, which includes the subject matter of example 15, above, sub-sheet pre-forming apparatus 114 comprises third cutter 152 configured to form discontinuous gaps 234 in resin film layer 200.

Forming discontinuous gaps 234 using third cutter 152 enables accurate placement of discontinuous gaps 234 with decreased equipment and energy costs as compared to use and maintenance of a laser-based device.

For example, but not by way of limitation, third cutter 152 is a CNC device that is programmed to cut away resin film layer 200, such as using a drill, a blade, or another suitable cutting surface, from each linear separation region 230 sufficiently to form discontinuous gaps 234 at each linear separation region 230. For another example, but not by way of limitation, impregnation of fiber reinforcement 220 with resin film layer 200 is substantially prevented within the locally cut away portions of discontinuous gaps 234 during subsequent formation of indexed prepreg composite sheet 300. The term "discontinuous" indicates that each discontinuous gap 234 also includes at least one region in which resin film layer 200 is not locally cut away, such that fiber reinforcement 220 is impregnated with resin film layer 200 within the at least one region of each discontinuous gap 234 during subsequent formation of indexed prepreg composite sheet 300. For example, but not by way of limitation, each discontinuous gap 234 is discontinuous to prevent indexed prepreg composite sheet 300 from separating prematurely along subsequently formed linear regions of weakness 330.

For example, but not by way of limitation, a single apparatus is used as region forming apparatus 102 and sub-sheet pre-forming apparatus 114. For another example, but not by way of limitation, a single apparatus is used as first laser 130 and third laser 150. For another example, but not by way of limitation, a single apparatus is used as first cutter 132 and third cutter 152. Alternatively, sub-sheet pre-forming apparatus 114 is a separate apparatus from region forming apparatus 102.

Referring generally to FIGS. 1A, 1B, and 2, and particularly to e.g. FIGS. 3B and 4B, the instant paragraph pertains to example 19 of the present disclosure. According to example 19, which includes the subject matter of any of examples 1-16, above, system 100 further comprises strip removal apparatus 118 configured to remove discontinuous hardened strips 232 from precursor prepreg composite sheet 301.

Pushing out discontinuous hardened strips 232 facilitates collection of indexed prepreg composite sheet 300 in rolled configuration 320 and reduces a shipping and storage weight of indexed prepreg composite sheet 300.

Referring generally to FIGS. 1A, 1B, and 2, and particularly to e.g. FIGS. 3B and 4B, the instant paragraph pertains to example 20 of the present disclosure. According to example 20, which includes the subject matter of example 19, above, strip removal apparatus 118 comprises fourth plunger 164 configured to push discontinuous hardened strips 232 out of precursor prepreg composite sheet 301 to form linear regions of weakness 330 of indexed prepreg composite sheet 300.

Pushing out discontinuous hardened strips 232 using fourth plunger 164 enables accurate removal of discontinuous hardened strips 232.

For example, but not by way of limitation, fourth plunger 164 is a CNC device that is programmed to push out discontinuous hardened strips 232 from precursor prepreg composite sheet 301. For another example, but not by way of limitation, fourth plunger 164 is operably coupled to a sensor system that is operable to locate discontinuous hardened strips 232 within precursor prepreg composite sheet 301. For another example, but not by way of limitation, the sensor system uses optical sensors to detect discontinuous hardened strips 232 within precursor prepreg composite sheet 301. For another example, but not by way of limitation, the sensor system uses any suitable system to detect discontinuous hardened strips 232 within precursor prepreg composite sheet 301 that enables fourth plunger 164 to function as described herein.

Referring generally to FIGS. 1A, 1B, and 2, and particularly to e.g. FIGS. 3B and 4B, the instant paragraph pertains to example 21 of the present disclosure. According to example 21, which includes the subject matter of example 19, above, strip removal apparatus 118 comprises fourth pressurized fluid nozzle 166 configured to push discontinuous hardened strips 232 out of precursor prepreg composite sheet 301 to form linear regions of weakness 330 of indexed prepreg composite sheet 300.

Pushing out discontinuous hardened strips 232 using fourth pressurized fluid nozzle 166 enables accurate removal of discontinuous hardened strips 232 with a decreased risk of physical damage to precursor prepreg composite sheet 301, relative to fourth plunger 164.

For example, but not by way of limitation, fourth pressurized fluid nozzle 166 is a CNC device that is programmed to push out discontinuous hardened strips 232 from precursor prepreg composite sheet 301. For another example, but not by way of limitation, fourth pressurized fluid nozzle 166 is in flow communication with pressurized gas source 131, and is operable to expel bursts of pressurized fluid to push out discontinuous hardened strips 232 from precursor prepreg composite sheet 301. For another example, but not by way of limitation, fourth pressurized fluid nozzle 166 is operably coupled to a sensor system that is operable to locate discontinuous hardened strips 232 within precursor prepreg composite sheet 301. For another example, but not by way of limitation, the sensor system uses optical sensors to detect discontinuous hardened strips 232 within precursor prepreg composite sheet 301. For another example, but not by way of limitation, the sensor system uses any suitable system to detect discontinuous hardened strips 232 within precursor prepreg composite sheet 301 that enables fourth pressurized fluid nozzle 166 to function as described herein.

Referring generally to FIGS. 1A, 1B, and 2, and particularly to e.g. FIGS. 3B and 4B, the instant paragraph pertains to example 22 of the present disclosure. According to example 22, which includes the subject matter of example 19, above, strip removal apparatus 118 comprises fourth vacuum nozzle 168 configured to pull discontinuous hardened strips 232 out of precursor prepreg composite sheet 301 to form linear regions of weakness 330 of indexed prepreg composite sheet 300.

Pulling out discontinuous hardened strips 232 using fourth vacuum nozzle 168 enables accurate removal of discontinuous hardened strips 232 with a decreased risk of physical damage to precursor prepreg composite sheet 301, relative to fourth plunger 164.

For example, but not by way of limitation, fourth vacuum nozzle 168 is a CNC device that is programmed to pull out discontinuous hardened strips 232 from precursor prepreg composite sheet 301. For another example, but not by way of limitation, fourth vacuum nozzle 168 is in flow communication with vacuum source 133, and is operable to create a suction force to pull out discontinuous hardened strips 232 from precursor prepreg composite sheet 301. For another example, but not by way of limitation, fourth vacuum nozzle 168 is operably coupled to a sensor system that is operable to locate discontinuous hardened strips 232 within precursor prepreg composite sheet 301. For another example, but not by way of limitation, the sensor system uses optical sensors to detect discontinuous hardened strips 232 within precursor prepreg composite sheet 301. For another example, but not by way of limitation, the sensor system uses any suitable system to detect discontinuous hardened strips 232 within precursor prepreg composite sheet 301 that enables fourth vacuum nozzle 168 to function as described herein.

For example, but not by way of limitation, a single apparatus is used as region removal apparatus 108 and strip removal apparatus 118. For another example, but not by way of limitation, a single apparatus is used as second plunger 144 and fourth plunger 164. For another example, but not by way of limitation, a single apparatus is used as second pressurized fluid nozzle 146 and fourth pressurized fluid nozzle 166. For another example, but not by way of limitation, a single apparatus is used as second vacuum nozzle 148 and fourth vacuum nozzle 168. Alternatively, strip removal apparatus 118 is a separate apparatus from region removal apparatus 108.

Referring generally to FIGS. 1A and 1B, and particularly to e.g. FIG. 2, system 100 further comprises sub-sheet post-forming apparatus 116 configured to form linear regions of weakness 330 of indexed prepreg composite sheet 300 by removing portions of precursor prepreg composite sheet 301. Linear regions of weakness 330 define sub-sheets 302 of indexed prepreg composite sheet 300. Each of sub-sheets 302 comprises set 304 of indexing openings 306 arranged in indexing pattern 308. The preceding subject matter of the instant paragraph is in accordance with example 23 of the present disclosure, and example 23 includes the subject matter of any of examples 1-14, above.

Forming linear regions of weakness 330 using sub-sheet post-forming apparatus 116 enables accurate placement of linear regions of weakness 330 with decreased manufacturing line complexity as compared to use and maintenance of sub-sheet preforming apparatus 114.

For example, but not by way of limitation, sub-sheet post-forming apparatus 116 is used to form linear regions of weakness 330 through machining operations on indexed prepreg composite sheet 300, as an alternative to initially forming linear separation regions 230 in resin film layer 200.

Referring e.g., to FIGS. 1A, 1B, 2, 6, 10A and 10B, method 1000 of making indexed prepreg composite sheet 300 is disclosed. Method 1000 comprises forming discrete regions 206 in resin film layer 200 (block 1002). Discrete regions 206 are arranged in indexing pattern 308. Method 1000 also includes forming precursor prepreg composite sheet 301 by impregnating fiber reinforcement 220 with resin film layer 200 having a viscosity (block 1004). Discrete regions 206 of resin film layer 200 form non-impregnated regions 310 of precursor prepreg composite sheet 301. Method 1000 additionally includes replacing non-impregnated regions 310 of precursor prepreg composite sheet 301 with indexing openings 306 (block 1006). The preceding subject matter of the instant paragraph is in accordance with example 24 of the present disclosure.

Indexing openings 306 arranged in indexing pattern 308 are configured to cooperate with guides 504 of tool 500 (shown in FIG. 5) to increase an accuracy of an alignment of fibers 222 in layers 710 of laminated precursor article 700 (shown in FIG. 7) with predetermined ideal orientation directions of fibers 222, as will be further described herein.

In addition, indexing openings 306 arranged in indexing pattern 308 are formed when indexed prepreg composite sheet 300 is formed, such as by a supplier of prepreg sheet material, thus reducing a time and labor burden on an end user of indexed prepreg composite sheet 300.

Referring generally to FIGS. 1A, 1B, 2, 10A and 10B, and particularly to e.g. FIG. 3B, the instant paragraph pertains to example 25 of the present disclosure. According to example 25, which includes the subject matter of example 24, above, forming discrete regions 206 in resin film layer 200 comprises forming hardened plugs 208 by locally curing resin film layer 200 (block 1008).

Forming hardened plugs 208 enables formation of discrete regions 206 with little or no debris.

Referring generally to FIGS. 1A, 1B, 2, 10A and 10B, and particularly to e.g. FIG. 3B, the instant paragraph pertains to example 26 of the present disclosure. According to example 26, which includes the subject matter of example 25, above, locally curing resin film layer 200 comprises locally irradiating resin film layer 200 with electromagnetic energy (block 1010).

Forming hardened plugs 208 by locally irradiating resin film layer 200 with electromagnetic energy enables accurate placement of discrete regions 206, and enables formation of discrete regions 206 with little or no debris.

For example, but not by way of limitation, resin film layer 200 is locally irradiated with electromagnetic energy by first laser 130 for a predetermined time at each discrete region 206 to locally cure resin film layer 200 sufficiently to form hardened plugs 208 of resin at each discrete region 206.

Referring generally to FIGS. 1A, 1B, 2, 3B, 4A, 10A and 10B, and particularly to e.g. FIG. 4B, the instant paragraph pertains to example 27 of the present disclosure. According to example 27, which includes the subject matter of any of examples 25-26, above, hardened plugs 208 correspond in size to non-impregnated regions 310 of precursor prepreg composite sheet 301.

Forming non-impregnated regions 310 using hardened plugs 208 enables formation of non-impregnated regions 310 with an accuracy of size equivalent to, for example but not by way of limitation, an accuracy of a CNC laser device used to form hardened plugs 208.

Referring generally to FIGS. 1A, 1B, 2, 3B, 4A, 10A and 10B, and particularly to e.g. FIG. 4B, the instant paragraph pertains to example 28 of the present disclosure. According to example 28, which includes the subject matter of any of examples 25-27, above, forming precursor prepreg composite sheet 301 further comprises locally penetrating fiber reinforcement 220 with hardened plugs 208 (block 1012).

Locally penetrating fiber reinforcement 220 with hardened plugs 208 pushes fibers 222 out of non-impregnated regions 310 during formation of precursor prepreg composite sheet 301 with little or no debris, and eliminates or reduces a need to remove fibers 222 from non-impregnated regions 310 in a later step.

For example, but not by way of limitation, the step of impregnating fiber reinforcement 220 with resin film layer 200 includes forcing fiber reinforcement 220 and resin film layer 200 together under pressure, such as using calendaring rollers 120 of calendaring apparatus 106, causing hardened plugs 208 to penetrate fiber reinforcement 220. For another example, but not by way of limitation, fibers 222 of fiber reinforcement 220 are locally displaced within precursor prepreg composite sheet 301 by hardened plugs 208. For another example, but not by way of limitation, hardened plugs 208 become lodged within fiber reinforcement 220 and substantially prevent impregnation of fiber reinforcement 220 with resin film layer 200 at non-impregnated regions 310.

Referring generally to FIGS. 1A, 1B, 2, 3B, 4A, 10A and 10B, and particularly to e.g. FIG. 4B, the instant paragraph pertains to example 29 of the present disclosure. According to example 29, which includes the subject matter of any of examples 25-28, above, replacing non-impregnated regions 310 of precursor prepreg composite sheet 301 with indexing openings 306 comprises removing hardened plugs 208 from precursor prepreg composite sheet 301 (block 1014).

Removing hardened plugs 208 from precursor prepreg composite sheet 301 forms indexing openings 306 with a reduced or eliminated need for cutting or machining precursor prepreg composite sheet 301.

Referring generally to FIGS. 1A, 1B, 2, 3B, 4A, 10A and 10B, and particularly to e.g. FIG. 4B, the instant paragraph pertains to example 30 of the present disclosure. According to example 30, which includes the subject matter of example 29, above, removing hardened plugs 208 from precursor prepreg composite sheet 301 comprises pushing hardened plugs 208 out of precursor prepreg composite sheet 301 (block 1016).

Pushing out hardened plugs 208 enables accurate removal of hardened plugs 208.

For example, but not by way of limitation, second plunger 144 is used to push hardened plugs 208 out of precursor prepreg composite sheet 301.

Referring generally to FIGS. 1A, 1B, 2, 3B, 4A, 10A and 10B, and particularly to e.g. FIG. 4B, the instant paragraph pertains to example 31 of the present disclosure. According to example 31, which includes the subject matter of example 30 above, hardened plugs 208 are pushed out of precursor prepreg composite sheet 301 using pressurized fluid 135.

Pushing out hardened plugs 208 using pressurized fluid 135 enables accurate removal of hardened plugs 208 with a decreased risk of physical damage to precursor prepreg composite sheet 301.

For example, but not by way of limitation, hardened plugs 208 are pushed out of precursor prepreg composite sheet 301 using pressurized fluid 135 applied through second pressurized fluid nozzle 146.

Referring generally to FIGS. 1A, 1B, 2, 3B, 4A, 10A and 10B, and particularly to e.g. FIG. 4B, the instant paragraph pertains to example 32 of the present disclosure. According to example 32, which includes the subject matter of example 29, above, removing hardened plugs 208 from precursor prepreg composite sheet 301 comprises pulling hardened plugs 208 out of precursor prepreg composite sheet 301 (block 1018).

Pulling out hardened plugs 208 enables accurate removal of hardened plugs 208.

Referring generally to FIGS. 1A, 1B, 2, 3B, 4A, 10A and 10B, and particularly to e.g. FIG. 4B, the instant paragraph pertains to example 33 of the present disclosure. According to example 33, which includes the subject matter of example 32, above, hardened plugs 208 are pulled out of precursor prepreg composite sheet 301 using vacuum 137.

Pulling out hardened plugs 208 using vacuum 137 enables accurate removal of hardened plugs 208 with a decreased risk of physical damage to precursor prepreg composite sheet 301.

For example, but not by way of limitation, hardened plugs 208 are pulled out of precursor prepreg composite sheet 301 using vacuum 137 applied through second vacuum nozzle 148.

Referring generally to FIGS. 1A, 1B, 2, 3A, 3B, 4A, 10A and 10B, and particularly to e.g. FIG. 4B, the instant paragraph pertains to example 34 of the present disclosure. According to example 34, which includes the subject matter of any of examples 29-33, above, removing hardened plugs 208 from precursor prepreg composite sheet 301 comprises applying heat to resin film layer 200 to decrease the viscosity of resin film layer 200 (block 1020) and removing hardened plugs 208 from precursor prepreg composite sheet 301 before the viscosity increases due to a formation of crosslinks in resin film layer 200 (block 1022).

Removing hardened plugs 208 from precursor prepreg composite sheet 301 before the viscosity increases due to the formation of crosslinks in resin film layer 200 reduces or eliminates a coupling of hardened plugs 208 to the resin in precursor prepreg composite sheet 301, thereby enabling a clean removal of hardened plugs 208.

For example, but not by way of limitation, heat is applied by at least of one of first heating system 122 and second heating system 124 during the step of impregnating fiber reinforcement 220 with resin film layer 200 to decrease the viscosity of resin film layer 200, thereby improving an effectiveness of the impregnation. At least one of during or after the step of impregnating fiber reinforcement 220 with resin film layer 200, however, crosslinks begin to form in resin film layer 200. When a sufficient amount of crosslink formation has occurred, the viscosity of resin film layer 200 increases.

Referring generally to FIGS. 1A, 1B, 2, 3A, 3C, 4A, 10A and 10B, and particularly to e.g. FIG. 4C, the instant paragraph pertains to example 35 of the present disclosure. According to example 35, which includes the subject matter of example 24, above, forming discrete regions 206 in resin film layer 200 comprises forming voids 212 in resin film layer 200 (block 1024).

Forming voids 212 in resin film layer 200 enables formation of discrete regions 206 with little or no disruption of fiber reinforcement 220.

Referring generally to FIGS. 1A, 1B, 2, 3A, 3C, 4A, 10A and 10B, and particularly to e.g. FIGS. 3D and 4D, the instant paragraph pertains to example 36 of the present disclosure. According to example 36, which includes the subject matter of example 35, above, voids 212 are larger than non-impregnated regions 310 of precursor prepreg composite sheet 301.

Forming voids 212 larger than non-impregnated regions 310 of precursor prepreg composite sheet 301 enables non-impregnated regions 310 of precursor prepreg composite sheet 301 to be formed with a predetermined size.

Referring generally to FIGS. 1A, 1B, 2, 3A, 3C, 4A, 10A and 10B, and particularly to e.g. FIGS. 3D and 4D, the instant paragraph pertains to example 37 of the present disclosure. According to example 37, which includes the subject matter of example 36, above, forming precursor prepreg composite sheet 301 further comprises compressing resin film layer 200 to shrink voids 212 until voids 212 correspond in size to non-impregnated regions 310 of precursor prepreg composite sheet 301 (block 1026).

Compressing resin film layer 200 to shrink voids 212 until voids 212 correspond in size to non-impregnated regions 310 enables non-impregnated regions 310 of precursor prepreg composite sheet 301 to be formed with a predetermined size.

For example, but not by way of limitation, calendaring rollers 120 compress resin film layer 200, thereby forcing resin film layer 200 inward from a boundary of each void 212 towards a center of void 212. The resulting postcompression boundary of void 212 defines the size of non-impregnated region 310 of precursor prepreg composite sheet 301. For example, but not by way of limitation, an amount of the shrinkage can be determined at least one of theoretically and experimentally, and a size of voids 212 can be selected to generate the predetermined size of non-impregnated regions 310 of precursor prepreg composite sheet 301.

Referring generally to FIGS. 1A, 1B, 2, 3A, 4A, 10A and 10B, and particularly to e.g. FIG. 3C, the instant paragraph pertains to example 38 of the present disclosure. According to example 38, which includes the subject matter of any of examples 35-37, above, forming voids 212 in resin film layer 200 comprises locally decomposing resin film layer 200 (block 1028).

Forming voids 212 by locally decomposing resin film layer 200 enables formation of discrete regions 206 with little or no debris.

Referring generally to FIGS. 1A, 1B, 2, 3A, 4A, 10A and 10B, and particularly to e.g. FIG. 3C, the instant paragraph pertains to example 39 of the present disclosure. According to example 39, which includes the subject matter of example 38, above, locally decomposing resin film layer 200 to form voids 212 comprises locally burning away resin film layer 200 (block 1030).

Forming voids 212 by locally burning away resin film layer 200 enables formation of discrete regions 206 with little or no debris.

Referring generally to FIGS. 1A, 1B, 2, 3A, 4A, 10A and 10B, and particularly to e.g. FIG. 3C, the instant paragraph pertains to example 40 of the present disclosure. According to example 40, which includes the subject matter of example 39, above, locally burning away resin film layer 200 comprises locally irradiating resin film layer 200 with electromagnetic energy (block 1032).

Forming voids 212 by locally irradiating resin film layer 200 with electromagnetic energy enables formation of discrete regions 206 with little or no debris.

For example, but not by way of limitation, first laser 130 is used to direct electromagnetic energy for a predetermined time at each discrete region 206 to locally decompose resin film layer 200 sufficiently to form voids 212 at each discrete region 206.

Referring generally to FIGS. 1A, 1B, 2, 3A, 4A, 10A and 10B, and particularly to e.g. FIG. 3C, the instant paragraph pertains to example 41 of the present disclosure. According to example 41, which includes the subject matter of any of examples 35-37, above, forming voids 212 in resin film layer 200 comprises cutting away portions of resin film layer 200 (block 1034).

Cutting away portions of resin film layer 200 enables formation of discrete regions 206 with decreased equipment and energy costs as compared to forming discrete regions 206 using electromagnetic energy.

For example, but not by way of limitation, portions of resin film layer 200 are cut away using first cutter 132 to form voids 212 at each discrete region 206.

Referring generally to FIGS. 1A, 1B, 2, 3A, 4A, 10A and 10B, and particularly to e.g. FIG. 3C, the instant paragraph pertains to example 42 of the present disclosure. According to example 42, which includes the subject matter of any of examples 35-37, above, forming voids 212 in resin film layer 200 comprises punching out portions of resin film layer 200 (block 1036).

Punching out portions of resin film layer 200 enables formation of discrete regions 206 with decreased equipment and energy costs as compared to as compared to forming discrete regions 206 using electromagnetic energy, and with less debris as compared to forming discrete regions 206 by cutting away portions of resin film layer 200.

For example, but not by way of limitation, first plunger 134 is used to punch out resin film layer 200 from each discrete region 206 to form voids 212 at each discrete region 206.

Referring generally to FIGS. 1A, 1B, 2, 3A, 3C, 4A, 10A and 10B, and particularly to e.g. FIG. 4C, the instant paragraph pertains to example 43 of the present disclosure. According to example 43, which includes the subject matter of any of examples 35-42, above, fiber reinforcement 220 comprises fibers 222, and replacing non-impregnated regions 310 of precursor prepreg composite sheet 301 with indexing openings 306 comprises removing fibers 222 from non-impregnated regions 310 of precursor prepreg composite sheet 301 (block 1038).

Removing fibers 222 from non-impregnated regions 310 enables formation of indexing openings 306 with a reduced or eliminated need for cutting or machining resin-impregnated portions of precursor prepreg composite sheet 301.

For example, but not be way of limitation, fibers 222 extend through non-impregnated regions 310 initially defined by voids 212, such that non-impregnated regions 310 are substantially devoid of resin.

Referring generally to FIGS. 1A, 1B, 2, 3A, 3C, 4A, 10A and 10B, and particularly to e.g. FIG. 4C, the instant paragraph pertains to example 44 of the present disclosure. According to example 44, which includes the subject matter of example 43, above, removing fibers 222 from within non-impregnated regions 310 of precursor prepreg composite sheet 301 comprises punching out fibers 222 from non-impregnated regions 310 (block 1040).

Punching out fibers 222 from within non-impregnated regions 310 enables accurate removal of fibers 222 from non-impregnated regions 310 to form indexing openings 306.

For example, but not by way of limitation, second plunger 144 is used to punch out fibers 222 from non-impregnated regions 310.

Referring generally to FIGS. 1A, 1B, 2, 3A, 3C, 4A, 10A and 10B, and particularly to e.g. FIG. 4C, the instant paragraph pertains to example 45 of the present disclosure. According to example 45, which includes the subject matter of example 43, above, removing fibers 222 from non-impregnated regions 310 of precursor prepreg composite sheet 301 comprises cutting away fibers 222 from non-impregnated regions 310 (block 1042).

Cutting away fibers 222 from within non-impregnated regions 310 enables accurate removal of fibers 222 from non-impregnated regions 310 to form indexing openings 306.

For example, but not by way of limitation, second cutter 142 is used to cut away fibers 222 from non-impregnated regions 310.

Referring generally to FIGS. 1A, 1B, 2, 3A, 3C, 4A, 10A and 10B, and particularly to e.g. FIG. 4C, the instant paragraph pertains to example 46 of the present disclosure. According to example 46, which includes the subject matter of example 45, above, cutting away fibers 222 from non-impregnated regions 310 of precursor prepreg composite sheet 301 comprises drilling out fibers 222 from non-impregnated regions 310 (block 1044).

Drilling out fibers 222 from within non-impregnated regions 310 enables accurate removal of fibers 222 from non-impregnated regions 310 to form indexing openings 306.

For example, but not by way of limitation, second cutter 142 equipped with a drill bit is used to cut away fibers 222 from non-impregnated regions 310.

Referring generally to FIGS. 1A, 1B, 2, 10A and 10B, and particularly to e.g. FIG. 4A, the instant paragraph pertains to example 47 of the present disclosure. According to example 47, which includes the subject matter of any of examples 24-46, above, method 1000 further comprises forming linear regions of weakness 330 of indexed prepreg composite sheet 300, wherein linear regions of weakness 330 define sub-sheets 302 of indexed prepreg composite sheet 300, each of sub-sheets 302 comprising set 304 of indexing openings 306 arranged in indexing pattern 308 (block 1046).

Sub-sheets 302 are easily separable from indexed prepreg composite sheet 300 along pre-formed linear regions of weakness 330, such as by a supplier of prepreg sheet material or an end user, thus reducing a time and labor burden on an end user of indexed prepreg composite sheet 300.

For example, but not by way of limitation, each sub-sheet 302 is configured to form a layer 710 of a laminated precursor article 700 (shown in FIG. 7).

Referring generally to FIGS. 1A, 1B, 2, 3A, 10A and 10B, and particularly to e.g. FIGS. 3B and 3C, the instant paragraph pertains to example 48 of the present disclosure. According to example 48, which includes the subject matter of example 47, above, forming linear regions of weakness 330 of indexed prepreg composite sheet 300 comprises forming linear separation regions 230 in resin film layer 200 (block 1048).

Linear separation regions 230 pre-formed in resin film layer 200 subsequently cause linear regions of weakness 330 to form in indexed prepreg composite sheet 300 when indexed prepreg composite sheet 300 is formed, reducing or eliminating a step of measuring and cutting of indexed prepreg composite sheet 300 to obtain sub-sheets 302.

Referring generally to FIGS. 1A, 1B, 2, 3A, 10A and 10B, and particularly to e.g. FIGS. 3B and 3C, the instant paragraph pertains to example 49 of the present disclosure. According to example 49, which includes the subject matter of example 48, above, further comprising forming linear separation regions 230 in resin film layer 200 when forming discrete regions 206 in resin film layer 200.

Forming linear separation regions 230 in resin film layer 200 when forming discrete regions 206 in resin film layer 200 reduces a time required to manufacture indexed prepreg composite sheet 300.

For example, but not by way of limitation, the apparatuses used to form linear separation regions 230 and discrete regions 206 in resin film layer 200 are configured to operate simultaneously on resin film layer 200.

Referring generally to FIGS. 1A, 1B, 2, 4A, 10A and 10B, and particularly to e.g. FIG. 3B, the instant paragraph pertains to example 50 of the present disclosure. According to example 50, which includes the subject matter of any of examples 48-49, above, forming linear separation regions 230 in resin film layer 200 comprises forming discontinuous hardened strips 232 in resin film layer 200 by locally curing resin film layer 200 (block 1050).

Forming discontinuous hardened strips 232 enables formation of linear separation regions 230 with little or no debris Referring generally to FIGS. 1A, 1B, 2, 4A, 10A and 10B, and particularly to e.g. FIG. 3B, the instant paragraph pertains to example 51 of the present disclosure. According to example 51, which includes the subject matter of example 50, above, forming discontinuous hardened strips 232 in resin film layer 200 comprises locally irradiating resin film layer 200 with electromagnetic energy (block 1052).

Forming discontinuous hardened strips 232 by locally irradiating resin film layer 200 with electromagnetic energy enables accurate placement of discontinuous hardened strips 232, and enables formation of linear separation regions 230 with little or no debris.

For example, but not by way of limitation, resin film layer 200 is locally irradiated with electromagnetic energy by third laser 150 for a predetermined time at each linear separation region 230 to locally cure resin film layer 200 sufficiently to form discontinuous hardened strips 232 at each linear separation region 232.

Referring generally to FIGS. 1A, 1B, 2, 4A, 10A and 10B, and particularly to e.g. FIGS. 3B and 4B, the instant paragraph pertains to example 52 of the present disclosure. According to example 52, which includes the subject matter of any of examples 50-51, above, forming linear regions of weakness 330 of indexed prepreg composite sheet 300 further comprises locally penetrating fiber reinforcement 220 with discontinuous hardened strips 232 when forming precursor prepreg composite sheet 301 (block 1054).

Locally penetrating fiber reinforcement 220 with discontinuous hardened strips 232 pushes fibers 222 out of linear regions of weakness 330 during formation of precursor prepreg composite sheet 301 with little or no debris, and eliminates or reduces a need to cut through fibers 222 within linear regions of weakness 310 to form sub-sheets 302 in a later step.

For example, but not by way of limitation, the step of impregnating fiber reinforcement 220 with resin film layer 200 includes forcing fiber reinforcement 220 and resin film layer 200 together under pressure, such as using calendaring rollers 120 of calendaring apparatus 106, causing discontinuous hardened strips 232 to penetrate fiber reinforcement 220. For another example, but not by way of limitation, fibers 222 of fiber reinforcement 220 are locally displaced within precursor prepreg composite sheet 301 by discontinuous hardened strips 232. For another example, but not by way of limitation, discontinuous hardened strips 232 become lodged within fiber reinforcement 220 and substantially prevent impregnation of fiber reinforcement 220 with resin film layer 200 at linear regions of weakness 330.

Referring generally to FIGS. 1A, 1B, 2, 4A, 10A and 10B, and particularly to e.g. FIGS. 3B and 4B, the instant paragraph pertains to example 53 of the present disclosure. According to example 53, which includes the subject matter of example 52, above, forming linear regions of weakness 330 of indexed prepreg composite sheet 300 further comprises pushing discontinuous hardened strips 232 out of precursor prepreg composite sheet 301 (block 1056).

Pushing discontinuous hardened strips 232 out of precursor prepreg composite sheet 301 forms linear regions of weakness 330 with a reduced or eliminated need for cutting or machining precursor prepreg composite sheet 301.

Referring generally to FIGS. 1A, 1B, 2, 4A, 10A and 10B, and particularly to e.g. FIGS. 3B and 4B, the instant paragraph pertains to example 54 of the present disclosure. According to example 54, which includes the subject matter of example 53, above, discontinuous hardened strips 232 are pushed out of precursor prepreg composite sheet 301 using pressurized fluid 135.

Pushing out discontinuous hardened strips 232 using pressurized fluid 135 enables accurate removal of discontinuous hardened strips 232 with a decreased risk of physical damage to precursor prepreg composite sheet 301.

For example, but not by way of limitation, discontinuous hardened strips 232 are pushed out of precursor prepreg composite sheet 301 using pressurized fluid 135 applied through fourth pressurized fluid nozzle 166.

Referring generally to FIGS. 1A, 1B, 2, 4A, 10A and 10B, and particularly to e.g. FIGS. 3B and 4B, the instant paragraph pertains to example 55 of the present disclosure. According to example 55, which includes the subject matter of example 52, above, forming linear regions of weakness 330 in indexed prepreg composite sheet 300 further comprises pulling discontinuous hardened strips 232 out of precursor prepreg composite sheet 301 (block 1058).

Pulling out discontinuous hardened strips 232 out of precursor prepreg composite sheet 301 forms linear regions of weakness 330 with a reduced or eliminated need for cutting or machining precursor prepreg composite sheet 301.

Referring generally to FIGS. 1A, 1B, 2, 4A, 10A and 10B, and particularly to e.g. FIGS. 3B and 4B, the instant paragraph pertains to example 56 of the present disclosure. According to example 56, which includes the subject matter of example 55, above, discontinuous hardened strips 232 are pulled out of precursor prepreg composite sheet 301 using vacuum 137.

Pulling out discontinuous hardened strips 232 using vacuum 137 enables accurate removal of discontinuous hardened strips 232 with a decreased risk of physical damage to precursor prepreg composite sheet 301.

For example, but not by way of limitation, discontinuous hardened strips 232 are pulled out of precursor prepreg composite sheet 301 using vacuum 137 applied through fourth vacuum nozzle 168.

Referring generally to FIGS. 1A, 1B, 2, 4A, 10A and 10B, and particularly to e.g. FIG. 3C, the instant paragraph pertains to example 57 of the present disclosure. According to example 57, which includes the subject matter of any of examples 48-49, above, forming linear separation regions 230 in resin film layer 200 comprises forming discontinuous gaps 234 in resin film layer 200 (block 1060).

Forming discontinuous gaps 234 in resin film layer 200 enables formation of linear separation regions 230 with little or no disruption of fiber reinforcement 220.

Referring generally to FIGS. 1A, 1B, 2, 4A, 10A and 10B, and particularly to e.g. FIG. 3C, the instant paragraph pertains to example 58 of the present disclosure. According to example 58, which includes the subject matter of example 57, above, forming discontinuous gaps 234 in resin film layer 200 comprises locally decomposing resin film layer 200 (block 1062).

Forming discontinuous gaps 234 by locally decomposing resin film layer 200 enables formation of linear separation regions 230 with little or no debris.

Referring generally to FIGS. 1A, 1B, 2, 4A, 10A and 10B, and particularly to e.g. FIG. 3C, the instant paragraph pertains to example 59 of the present disclosure. According to example 59, which includes the subject matter of example 58, above, locally decomposing resin film layer 200 to form discontinuous gaps 234 comprises locally burning away resin film layer 200 (block 1064).

Forming discontinuous gaps 234 by locally burning away resin film layer 200 enables formation of linear separation regions 230 with little or no debris.

Referring generally to FIGS. 1A, 1B, 2, 4A, 10A and 10B, and particularly to e.g. FIG. 3C, the instant paragraph pertains to example 60 of the present disclosure. According to example 60, which includes the subject matter of example 59, above, locally burning away resin film layer 200 comprises locally irradiating resin film layer 200 with electromagnetic energy (block 1066).

Forming discontinuous gaps 234 by locally irradiating resin film layer 200 enables formation of linear separation regions 230 with little or no debris.

For example, but not by way of limitation, third laser 150 is used to direct electromagnetic energy for a predetermined time at each linear separation region 230 to locally decompose resin film layer 200 sufficiently to form discontinuous gaps 234 at each linear separation region 230.

Referring generally to FIGS. 1A, 1B, 2, 4A, 10A and 10B, and particularly to e.g. FIG. 3C, the instant paragraph pertains to example 61 of the present disclosure. According to example 61, which includes the subject matter of example 57, above, forming discontinuous gaps 234 in resin film layer 200 comprises cutting away portions of resin film layer 200 (block 1068).

Cutting away portions of resin film layer 200 enables formation of linear separation regions 230 with decreased equipment and energy costs as compared to forming linear separation regions 230 using electromagnetic energy.

For example, but not by way of limitation, portions of resin film layer 200 are cut away using third cutter 152 to form discontinuous gaps 234 at each linear separation region 230.

Referring e.g., to FIGS. 4E, 5-9, and 11, method 1200 of making laminated precursor article 700 is disclosed. Laminated precursor article 700 comprises layers 710, having predetermined ideal orientation directions of fibers 222 within laminated precursor article 700. Method 1200 comprises providing at least one indexed prepreg composite sheet 300 comprising fibers 222 having longitudinal direction 314 and sets 304 of indexing openings 306 (block 1202). Each of sets 304 of indexing openings 306 is arranged in indexing pattern 308 oriented at one of pattern angles 312 relative to longitudinal direction 314 of fibers 222. Indexing pattern 308 corresponds to guide pattern 508 of guides 504 in tool 500. Method 1200 also includes separating at least a portion of at least one indexed prepreg composite sheet 300 into sub-sheets 302 corresponding to layers 710 of laminated precursor article 700 (block 1204). Each of sub-sheets 302 comprises one of sets 304 of indexing openings 306 at one of pattern angles 312 relative to longitudinal direction 314 of fibers 222. Method 1200 further includes stacking sub-sheets 302 in stacking sequence by aligning indexing openings 306 of each of sub-sheets 302 with guides 504 of tool 500 and inserting guides 504 through indexing openings 306 (block 1206). The preceding subject matter of the instant paragraph is in accordance with example 62 of the present disclosure.

Indexing openings 306 arranged in indexing pattern 308 are configured to cooperate with guides 504 of tool 500 to increase an accuracy of an alignment of fibers 222 in layers 710 of laminated precursor article 700 (shown in FIG. 7) with predetermined ideal orientation directions of fibers 222.

For example, but not by way of limitation, laminated precursor article 700 can be cured and trimmed to form article 800. Article 800 includes layers 900 corresponding to layers 710. For example, but not by way of limitation, laminated precursor article 700 is illustrated in FIGS. 6-7 as having four layers 710 with predetermined ideal orientation directions of fibers 222 of 90 degrees, +45 degrees, −45 degrees, and 0 degrees, respectively, and article 800 is illustrated in FIG. 9 as having four corresponding layers 901, 902, 903, and 904. It should be understood, however, that laminated precursor article 700 may be formed according to the embodiments described herein with any number of layers 710 each having any predetermined ideal orientation direction of fibers 222, such that article 800 has a corresponding number of layers 900.

Referring generally to FIGS. 5-9 and 11, and particularly to e.g. FIG. 4E, the instant paragraph pertains to example 63 of the present disclosure. According to example 63, which includes the subject matter of example 62, above, at least the portion of at least one indexed prepreg composite sheet 300 comprises linear regions of weakness 330 defining sub-sheets 302, and separating at least the portion of at least one indexed prepreg composite sheet 300 into sub-sheets 302 comprises separating at least the portion of at least one indexed prepreg composite sheet 300 along linear regions of weakness 330 (block 1208).

Sub-sheets 302 are easily separable from indexed prepreg composite sheet 300 along linear regions of weakness 330, such as by a supplier of prepreg sheet material or an end user, thus eliminating or reducing a step of measuring and cutting indexed prepreg composite sheet 300 by an end user of indexed prepreg composite sheet 300.

Referring generally to FIGS. 5-9 and 11, and particularly to e.g. FIG. 4E, the instant paragraph pertains to example 64 of the present disclosure. According to example 64, which includes the subject matter of any of examples 62-63, above, method 1200 further comprises stacking sub-sheets 302 on tool face 502 of tool 500 (block 1210).

Tool face 502 enables, but does not require, laminated precursor article 700 to be cured without uncoupling laminated precursor article 700 from guides 504.

For example, but not by way of limitation, tool face 502 provides a substantially planar, adhesion-resistant platform on which to stack sub-sheets 302 to form layers 710. For another example, but not by way of limitation, tool face 502 is coupled to guides 504. For another example, but not by way of limitation, tool face 502 and guides 504 are suitably configured to withstand autoclave temperatures.

Referring generally to FIGS. 5-6, 8-9 and 11, and particularly to e.g. FIGS. 4E and 7, the instant paragraph pertains to example 65 of the present disclosure. According to example 65, which includes the subject matter of any of examples 62-64, above, method 1200 further comprises determining the stacking sequence based on the predetermined ideal orientation directions of fibers 222 in layers 710 of laminated precursor article 700 (block 1212).

Determining the stacking sequence based on the predetermined ideal orientation directions of fibers 222 in layers 710 of laminated precursor article 700 enables each sub-sheet 302 in the stacking sequence to be identified based on pattern angle 312 of indexing openings 306, such that fibers 222 of sub-sheets 302 substantially align with the predetermined ideal orientation directions in each layer 710 when indexing openings 306 are aligned with guides 504.

For example, but not by way of limitation, each sub-sheet 302 in the stacking sequence is selected to have the one of pattern angles 312 that corresponds to the predetermined ideal orientation direction of fibers 222 in the corresponding layer 710 of laminated precursor article 700.

Referring generally to FIGS. 5-6, 8-9, and 11, and particularly to e.g. FIGS. 4E and 7, the instant paragraph pertains to example 66 of the present disclosure. According to example 66, which includes the subject matter of example 65, above, stacking sub-sheets 302 in the stacking sequence aligns fibers 222 in sub-sheets 302 with the predetermined ideal orientation directions of fibers 222 in layers 710 of laminated precursor article 700 within a tolerance of less than about 2 degrees.

Aligning fibers 222 in sub-sheets 302 with the predetermined ideal orientation directions of fibers 222 in layers 710 of laminated precursor article 700 within a tolerance of less than about 2 degrees correspondingly improves a compliance of article 800 with design strength and stiffness specifications.

For example, but not by way of limitation, indexing openings 306 are locatable on indexed prepreg composite sheet 300 with a suitable accuracy such that fibers 222 in sub-sheets 302 are aligned with the predetermined ideal orientation directions of fibers 222 in layers 710 of laminated precursor article 700 within a tolerance of less than about 2 degrees.

Referring generally to FIGS. 5-6, 8-9, and 11, and particularly to e.g. FIGS. 4E and 7, the instant paragraph pertains to example 67 of the present disclosure. According to example 67, which includes the subject matter of example 65, above, stacking sub-sheets 302 in the stacking sequence aligns fibers 222 in sub-sheets 302 with the predetermined ideal orientation directions of fibers 222 in layers 710 of laminated precursor article 700 within a tolerance of less than about 0.5 degrees.

Aligning fibers 222 in sub-sheets 302 with the predetermined ideal orientation directions of fibers 222 in layers 710 of laminated precursor article 700 within a tolerance of less than about 0.5 degrees correspondingly improves a compliance of article 800 with design strength and stiffness specifications.

For example, but not by way of limitation, indexing openings 306 are locatable on indexed prepreg composite sheet 300 with a suitable accuracy such that fibers 222 in sub-sheets 302 are aligned with the predetermined ideal orientation directions of fibers 222 in layers 710 of laminated precursor article 700 within a tolerance of less than about 0.5 degrees.

Referring generally to FIGS. 5-6, 8-9, and 11, and particularly to e.g. FIGS. 4E and 7, the instant paragraph pertains to example 68 of the present disclosure. According to example 68, which includes the subject matter of example 65, above, stacking sub-sheets 302 in the stacking sequence aligns the orientation directions of fibers 222 in sub-sheets 302 with the predetermined ideal orientation directions of fibers 222 in layers 710 of laminated precursor article 700 within a tolerance of less than or equal to about 0.05 degrees.

Aligning fibers 222 in sub-sheets 302 with the predetermined ideal orientation directions of fibers 222 in layers 710 of laminated precursor article 700 within a tolerance of less than or equal to about 0.05 degrees correspondingly improves a compliance of article 800 with design strength and stiffness specifications.

For example, but not by way of limitation, indexing openings 306 are locatable on indexed prepreg composite sheet 300 with a suitable accuracy such that fibers 222 in sub-sheets 302 are aligned with the predetermined ideal orientation directions of fibers 222 in layers 710 of laminated precursor article 700 within a tolerance of less than or equal to about 0.05 degrees. For another example, but not by way of limitation, article 800 has a length of about 48 inches, and each indexing opening 306 is locatable on indexed prepreg composite sheet 300 with an accuracy of about 0.030 inches using a CNC device, such as a CNC embodiment of first laser 130, such that fibers 222 in sub-sheets 302 are aligned with the predetermined ideal orientation directions of fibers 222 in layers 710 of laminated precursor article 700 within a tolerance of about 0.05 degrees.

Referring generally to FIGS. 5-6, 8-9, and 11, and particularly to e.g. FIGS. 4E and 7, the instant paragraph pertains to example 69 of the present disclosure. According to example 69, which includes the subject matter of any of examples 62-68, above, stacking sub-sheets 302 further comprises defining the stacking sequence based at least partially on preselected materials of each of layers 710 of laminated precursor article 700 (block 1214), and selecting sub-sheets 302 to be stacked from materials identical to the preselected materials of layers 710 to which sub-sheets 302 correspond (block 1216).

Defining the stacking sequence based at least partially on preselected materials of each of layers 710 of laminated precursor article 700, and selecting sub-sheets 302 to be stacked from materials identical to the preselected materials of layers 710 to which sub-sheets 302 correspond, improves an efficiency of forming laminated precursor article 700 and enables a compliance of article 800 with design strength and stiffness specifications.

For example, but not by way of limitation, a preselected material for a first subset of layers 710 includes fibers 222 formed from fiberglass, and a preselected material for a second subset of layers 710 includes fibers 222 formed from carbon. The stacking sequence is defined such that sub-sheets 302 corresponding to the first subset of layers 710 each include fibers 222 formed from fiberglass, and sub-sheets 302 corresponding to the second subset of layers 710 each include fibers 222 formed from carbon.

Referring generally to FIGS. 5-6, 8-9, and 11 and particularly to e.g. FIGS. 4E and 7, the instant paragraph pertains to example 70 of the present disclosure. According to example 70, which includes the subject matter of any of examples 62-69, above, method 1200 further comprises locating indexing openings 306 on each of sub-sheets 302 of at least one indexed prepreg sheet 300 such that indexing openings 306 lie outside virtual perimeter 704 corresponding to perimeter 804 of article 800 to be formed from laminated precursor article 700 (block 1218).

Forming indexing openings 306 potentially introduces regions of compromised integrity of fiber reinforcement 220. For example, but not by way of limitation, forming hardened plugs 208 displaces fibers 222 from each discrete region 206 into regions adjacent each indexing opening 306. For example, but not by way of limitation, forming voids 212 and removing fibers 222 from discrete regions 206 to form indexing openings 306 breaks fibers 222 adjacent each indexing opening 306. Locating indexing openings 306 outside virtual perimeter 704 reduces or eliminates a potential for such regions of compromised integrity of fiber reinforcement 220 to be included within article 800.

As used herein, "virtual" means having the attributes of a feature without possessing its physical form. For example, but not by way of limitation, virtual perimeter 704 defines at least one line along which laminated precursor article 700 will be trimmed to form article 800, and indexing openings 306 lie on portions of laminated precursor article 700 that will be trimmed away to form article 800.

Referring generally to FIGS. 5-9 and 11, and particularly to e.g. FIG. 4E, the instant paragraph pertains to example 71 of the present disclosure. According to example 71, which includes the subject matter of any of examples 62-70, above, method 1200 further comprises forming tags 316 on at least one indexed prepreg composite sheet 300, wherein each of sub-sheets 302 includes at least one of tags 316, and wherein each of tags 316 identifies an intended placement of one of sub-sheets 302 in the stacking sequence (block 1220).

Including tags 316 on sub-sheets 302 increases an ease of stacking sub-sheets 302 in the stacking order. Additionally or alternatively, including tags on sub-sheets 302 facilitates ensuring that the correct sub-sheets 302 are used to make a given article 800. For example, but not by way of limitation, each tag 316 additionally identifies at least one of a material used to form the associated indexed prepreg composite sheet 300, a batch number or other information associated with the location and time of manufacture of the associated indexed prepreg composite sheet 300, an article 800 for the manufacture of which the associated sub-sheet 302 was intended, a serial number of the associated sub-sheet 302, and other suitable identification information associated with sub-sheet 302 and/or indexed prepreg composite sheet 300.

For example, but not by way of limitation, tag 316 includes one or more of a UPC barcode, a 2D barcode, another suitable barcode, plain text, and another suitable form of identifier for sub-sheets 302.

Referring generally to FIGS. 5-9 and 11, and particularly to e.g. FIGS. 2, 3A, 4A, and 4E, the instant paragraph pertains to example 72 of the present disclosure. According to example 72, which includes the subject matter of example 71, above, forming tags 316 on at least one indexed prepreg composite sheet 300 comprises printing tags 316 on backing material 210 coupled to at least one indexed prepreg composite sheet 300 (block 1222).

Printing tags 316 on backing material 210 enables tags 316 to be associated with sub-sheets 302 without alteration to a structure of sub-sheets 302. Additionally, printing tags 316 on backing material 210 enables backing material 210 to be retained as a quality record or receipt that documents, for example, details of sub-sheets 302 included in each article 800.

For example, but not by way of limitation, backing material 210 is initially coupled to resin film layer 200 to facilitate handling of resin film layer 200 by conveyor system 104 of system 100. For example, but not by way of limitation, backing material 210 remains coupled to precursor prepreg composite sheet 301 and indexed prepreg composite sheet 300 as they are successively formed from resin film layer 200 and fiber reinforcement 220, to facilitate handling of precursor prepreg composite sheet 301 and indexed prepreg composite sheet 300 by conveyor system 104 of system 100, and to facilitate packaging of indexed prepreg composite sheet 300 for shipment and storage, such as in rolled configuration 320. Alternatively or additionally, a separate backing material (not shown) is coupled to indexed prepreg composite sheet 300 after indexed prepreg composite sheet 300 is formed. For example, but not by way of limitation, backing material 210 remains coupled to sub-sheets 302 as they are separated from at least one indexed prepreg composite sheet 300, to facilitate handling of sub-sheets 302 by an end user. For example, but not by way of limitation, backing material 210 is peeled or otherwise removed from each sub-sheet 302 just prior to stacking on tool 500.

Referring generally to FIGS. 5-9 and 11, and particularly to e.g. FIG. 4E, the instant paragraph pertains to example 73 of the present disclosure. According to example 73, which includes the subject matter of example 71, above, forming tags 316 on at least one indexed prepreg composite sheet 300 comprises stamping tags 316 into at least one indexed prepreg composite sheet 300 (block 1224).

Stamping tags 316 into indexed prepreg composite sheet 300 enables tags 316 to be associated with sub-sheets 302 in applications where backing material 210 is not present or not printable, or after removal of backing material 210.

Referring generally to FIGS. 5-9 and 11, and particularly to e.g. FIG. 4E, the instant paragraph pertains to example 74 of the present disclosure. According to example 74, which includes the subject matter of example 71, above, forming tags 316 on at least one indexed prepreg composite sheet 300 comprises locally decomposing at least one indexed prepreg composite sheet 300 (block 1226).

Forming tags 316 on indexed prepreg composite sheet 300 by locally decomposing indexed prepreg composite sheet 300 enables tags 316 to be associated with sub-sheets 302 in applications where backing material 210 is not present or not printable, or after removal of backing material 210.

Referring generally to FIGS. 5-9 and 11, and particularly to e.g. FIG. 4E, the instant paragraph pertains to example 75 of the present disclosure. According to example 75, which includes the subject matter of example 74, above, locally decomposing at least one indexed prepreg composite sheet 300 comprises locally burning away at least one indexed prepreg composite sheet 300 (block 1228).

Forming tags 316 on indexed prepreg composite sheet 300 by locally burning away indexed prepreg composite sheet 300 enables tags 316 to be associated with sub-sheets 302 in applications where backing material 210 is not present or not printable, or after removal of backing material 210.

Referring generally to FIGS. 2, 5-9, and 11, and particularly to e.g. FIG. 4E, the instant paragraph pertains to example 76 of the present disclosure. According to example 76, which includes the subject matter of example 75, above, locally burning away at least one indexed prepreg composite sheet 300 comprises locally irradiating at least one indexed prepreg composite sheet 300 with electromagnetic energy (block 1230).

Forming tags 316 on indexed prepreg composite sheet 300 by locally irradiating indexed prepreg composite sheet 300 enables tags 316 to be associated with sub-sheets 302 in applications where backing material 210 is not present or not printable, or after removal of backing material 210.

For example, but not by way of limitation, a laser (not shown) similar to first laser 130 is used to form tags 316 by locally irradiating indexed prepreg composite sheet 300.

Referring generally to FIGS. 2, 5-9, and 11, and particularly to e.g. FIG. 4E, the instant paragraph pertains to example 77 of the present disclosure. According to example 77, which includes the subject matter of example 71, above, forming tags 316 on at least one indexed prepreg composite sheet 300 comprises cutting tags 316 into at least one indexed prepreg composite sheet 300 (block 1232).

Cutting tags 316 into indexed prepreg composite sheet 300 enables tags 316 to be associated with sub-sheets 302 in applications where backing material 210 is not present or not printable, or after removal of backing material 210.

For example, but not by way of limitation, one of second cutter 142 and another cutter (not shown) similar to second cutter 142 is used to cut tags 316 into prepreg composite sheet 300.

Referring generally to FIGS. 5-9 and 11, and particularly to e.g. FIG. 4E, the instant paragraph pertains to example 78 of the present disclosure. According to example 78, which includes the subject matter of any of examples 71-77, above, method 1200 further comprises forming each of tags 316 on each of sub-sheets 302 outside virtual perimeter 704 corresponding to perimeter 804 of article 800 to be formed from laminated precursor article 700 (block 1234).

Forming tags 316 potentially introduces regions of compromised integrity of fiber reinforcement 220. For example, but not by way of limitation, each of stamping and cutting tags 316 into indexed prepreg composite sheet 300 displaces or breaks fibers 222 adjacent each tag 316. For example, but not by way of limitation, forming tags 316 by at least one of locally decomposing, locally burning away, and locally irradiating indexed prepreg composite sheet 300 displaces fibers 222 adjacent each tag 316. Locating tags 316 outside virtual perimeter 704 reduces or eliminates a potential for such regions of compromised integrity of fiber reinforcement 220 to be included within article 800.

For example, but not by way of limitation, tags 316 lie on portions of laminated precursor article 700 that will be trimmed away to form article 800.

Referring generally to FIGS. 4E, 7-9, and 11, and particularly to e.g. FIGS. 5 and 6, the instant paragraph pertains to example 79 of the present disclosure. According to example 79, which includes the subject matter of any of examples 62-78, above, method 1200 further comprises curing laminated precursor article 700 while sub-sheets 302 are stacked on tool face 502 of tool 500 (block 1236).

Curing laminated precursor article 700 without uncoupling laminated precursor article 700 from guides 504 facilitates maintaining an accuracy of an alignment of fibers 222 in layers 710 of laminated precursor article 700 while laminated precursor article 700 is cured.

Examples of the present disclosure may be described in the context of aircraft manufacturing and service method 1100 as shown in FIG. 12 and aircraft 1102 as shown in FIG. 13. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 13, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing 1108 may be fabricated or manufactured in a manner similar to components or subassemblies produced while aircraft 1102 is in service. Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service, e.g., maintenance and service stage (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples presented and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims.

What is claimed is:

1. A method of making an indexed prepreg composite sheet, the method comprising:
   forming discrete regions in a resin film layer, wherein the discrete regions are arranged in an indexing pattern;
   forming a precursor prepreg composite sheet by impregnating a fiber reinforcement with the resin film layer having a viscosity, wherein the discrete regions of the resin film layer form non-impregnated regions of the precursor prepreg composite sheet; and
   replacing the non-impregnated regions of the precursor prepreg composite sheet with indexing openings.

2. The method according to claim 1, wherein forming the discrete regions in the resin film layer comprises forming hardened plugs by locally curing the resin film layer.

3. The method according to claim 2, wherein locally curing the resin film layer comprises locally irradiating the resin film layer with electromagnetic energy.

4. The method according to claim 2, wherein the hardened plugs correspond in size to the non-impregnated regions of the precursor prepreg composite sheet.

5. The method according to claim 2, wherein forming the precursor prepreg composite sheet further comprises locally penetrating the fiber reinforcement with the hardened plugs.

6. The method according to claim 2, wherein replacing the non-impregnated regions of the precursor prepreg composite sheet with the indexing openings comprises removing the hardened plugs from the precursor prepreg composite sheet.

7. The method according to claim 6, wherein removing the hardened plugs from the precursor prepreg composite sheet comprises pushing the hardened plugs out of the precursor prepreg composite sheet.

8. The method according claim 7, wherein the hardened plugs are pushed out of the precursor prepreg composite sheet using a pressurized fluid.

9. The method according to claim 6, wherein removing the hardened plugs from the precursor prepreg composite sheet comprises pulling the hardened plugs out of the precursor prepreg composite sheet.

10. The method according claim 9, wherein the hardened plugs are pulled out of the prepreg composite sheet using a vacuum.

11. The method according to claim 6, wherein removing the hardened plugs from the precursor prepreg composite sheet comprises applying heat to the resin film layer to decrease the viscosity of the resin film layer and removing the hardened plugs from the precursor prepreg composite sheet before the viscosity increases due to a formation of crosslinks in the resin film layer.

12. The method according to claim 1, wherein forming the discrete regions in the resin film layer comprises forming voids in the resin film layer.

13. The method according to claim 12, wherein the voids are larger than the non-impregnated regions of the precursor prepreg composite sheet.

14. The method according to claim 13, wherein forming the precursor prepreg composite sheet further comprises compressing the resin film layer to shrink the voids until the voids correspond in size to the non-impregnated regions of the precursor prepreg composite sheet.

15. The method according to claim 12, wherein:
   the fiber reinforcement comprises fibers, and
   replacing the non-impregnated regions of the precursor prepreg composite sheet with the indexing openings comprises removing the fibers from the non-impregnated regions of the precursor prepreg composite sheet.

16. The method according to claim 1, further comprising forming linear regions of weakness of the indexed prepreg composite sheet, wherein the linear regions of weakness define sub-sheets of the indexed prepreg composite sheet, each of the sub-sheets comprising a set of the indexing openings arranged in the indexing pattern.

17. The method according to claim 16, wherein forming the linear regions of weakness of the indexed prepreg composite sheet comprises forming linear separation regions in the resin film layer.

18. The method according to claim 17, wherein forming the linear separation regions in the resin film layer comprises forming discontinuous hardened strips in the resin film layer by locally curing the resin film layer.

19. The method according to claim 18, wherein forming the linear regions of weakness of the indexed prepreg composite sheet further comprises locally penetrating the fiber reinforcement with the discontinuous hardened strips when forming the precursor prepreg composite sheet.

20. The method according to claim 17, wherein forming the linear separation regions in the resin film layer comprises forming discontinuous gaps in the resin film layer.

* * * * *